(12) United States Patent
Ozawa

(10) Patent No.: US 9,217,885 B2
(45) Date of Patent: Dec. 22, 2015

(54) MICROLENS ARRAY SUBSTRATE, ELECTRO-OPTIC DEVICE, AND ELECTRONIC APPARATUS

(71) Applicant: Seiko Epson Corporation, Tokyo (JP)

(72) Inventor: Norihiko Ozawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/490,074

(22) Filed: Sep. 18, 2014

(65) Prior Publication Data

US 2015/0092277 A1    Apr. 2, 2015

(30) Foreign Application Priority Data

Oct. 1, 2013 (JP) ................. 2013-206152

(51) Int. Cl.
| | |
|---|---|
| G02B 27/10 | (2006.01) |
| H04N 5/225 | (2006.01) |
| G02F 1/13 | (2006.01) |
| G02B 3/00 | (2006.01) |

(52) U.S. Cl.
CPC ............ *G02F 1/13* (2013.01); *G02B 3/005* (2013.01); *G02B 3/0056* (2013.01)

(58) Field of Classification Search
CPC .............................. G02B 3/005; G02B 3/0056
USPC ................... 359/619, 620; 348/340
See application file for complete search history.

(56) References Cited

U.S. PATENT DOCUMENTS

| | | | |
|---|---|---|---|
| 7,329,611 B2 | 2/2008 | Uehara et al. | |
| 7,525,732 B2 | 4/2009 | Uehara et al. | |
| 7,561,336 B2 * | 7/2009 | Osaka et al. | ......... H04N 5/7441 |
| | | | 348/340 |
| 7,643,100 B2 | 1/2010 | Uehara et al. | |
| 7,678,454 B2 | 3/2010 | Uehara et al. | |
| 2005/0211665 A1 | 9/2005 | Gao et al. | |

FOREIGN PATENT DOCUMENTS

| | | |
|---|---|---|
| JP | 09-043588 A | 2/1997 |
| JP | 2000-193928 A | 7/2000 |
| JP | 2002-182586 A | 6/2002 |
| JP | 2004-004745 A | 1/2004 |
| JP | 2005-284278 A | 10/2005 |
| JP | 2006-138987 A | 6/2006 |
| JP | 2012-177775 A | 9/2012 |

* cited by examiner

*Primary Examiner* — William Choi
(74) *Attorney, Agent, or Firm* — ALG Intellectual Property, LLC

(57) ABSTRACT

A microlens array substrate includes a substrate having transparency and having a plurality of concave portions provided on a first surface to correspond to a plurality of pixels, and a lens layer having a different refractive index from a refractive index of the substrate, which is provided on the first surface of the substrate to fill in the plurality of concave portions, in which each of the plurality of concave portions has a flat portion arranged at the center portion, a curved surface portion arranged to surround the flat portion, an edge portion arranged to surround the curved surface portion and connected to the first surface of the substrate, and an angle between the edge portion and the first surface in a cross section passing through the center portion is smaller than an angle between a virtual curved surface obtained by extending the curved surface portion toward the first surface and the first surface.

18 Claims, 15 Drawing Sheets

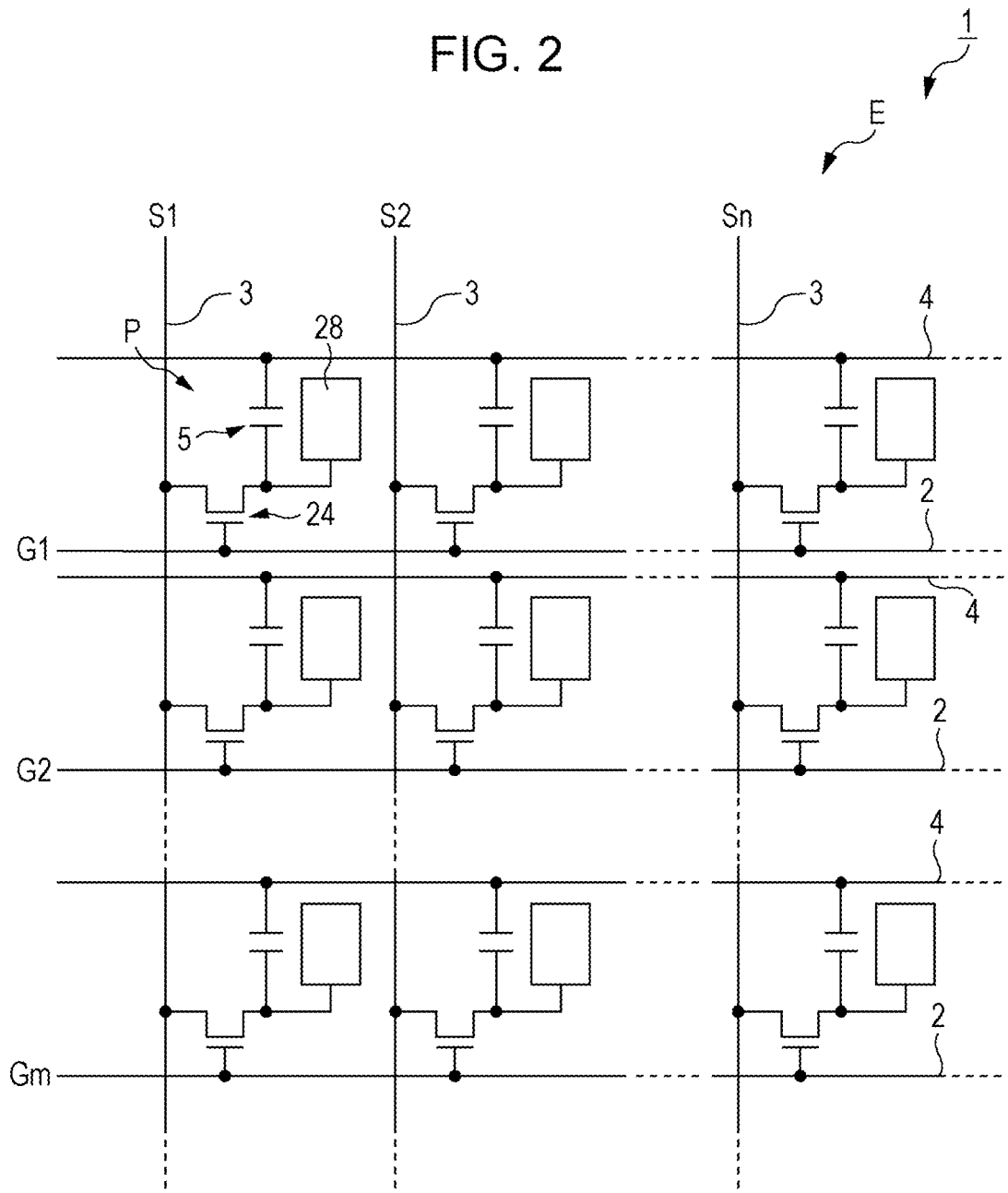

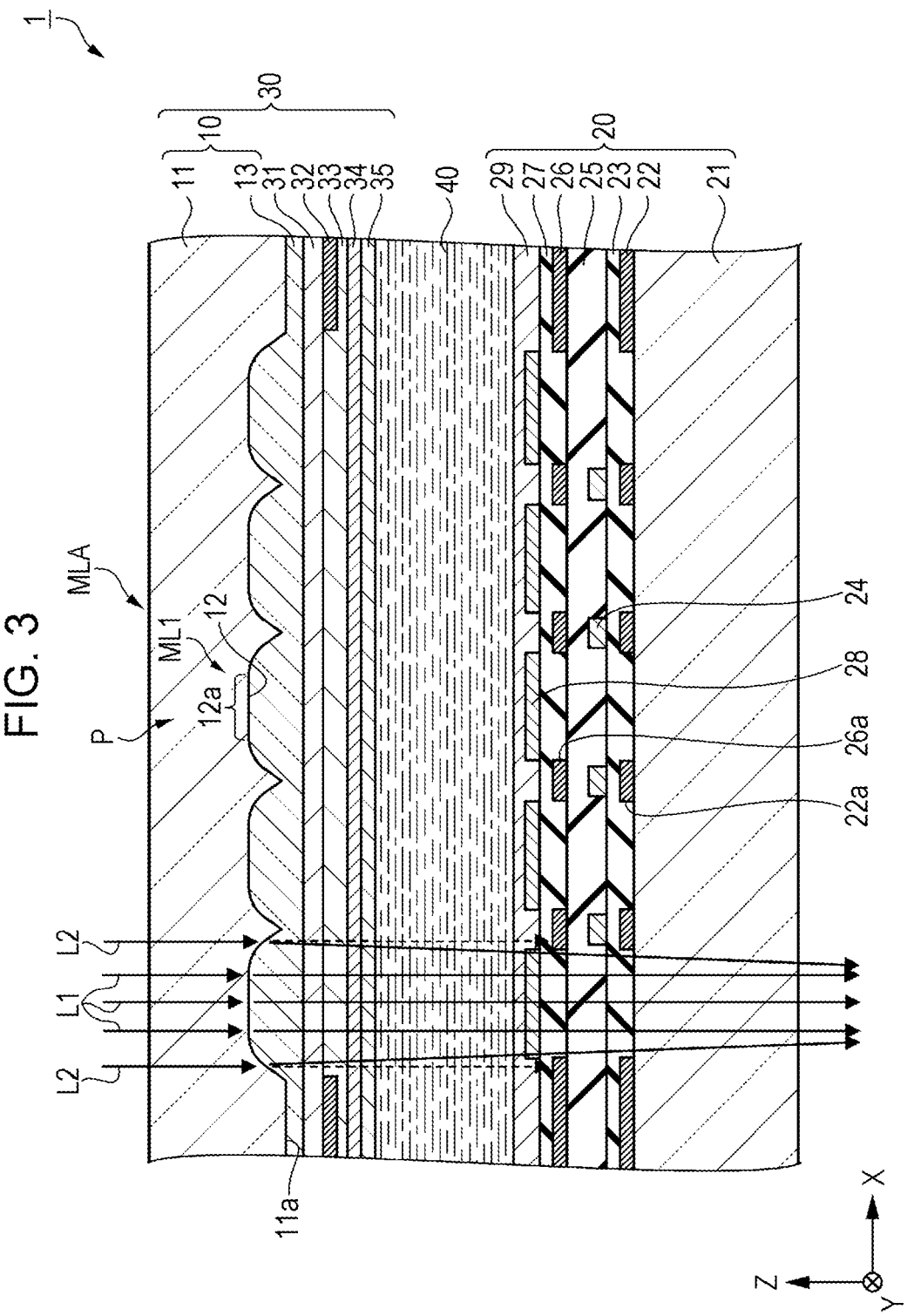

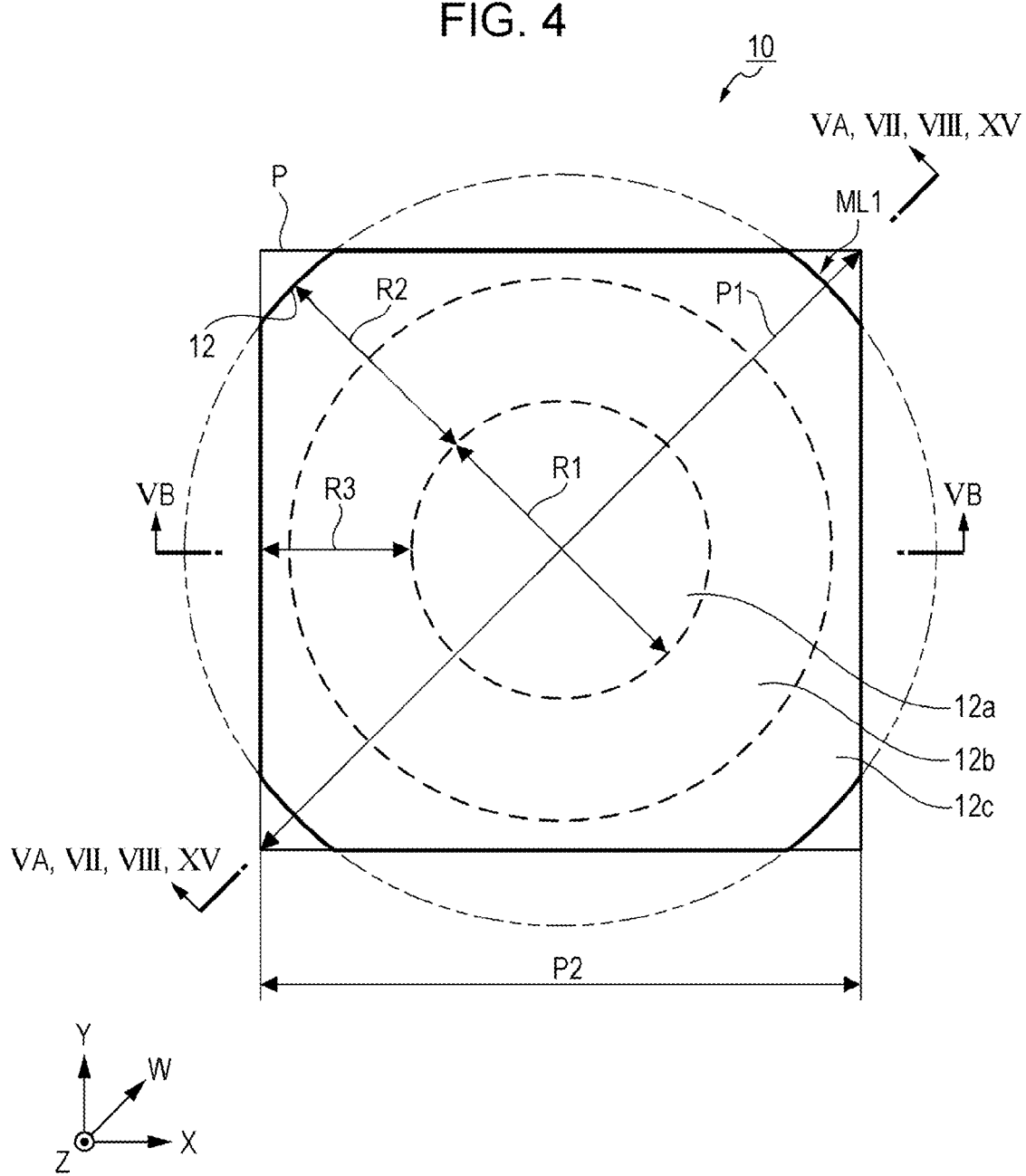

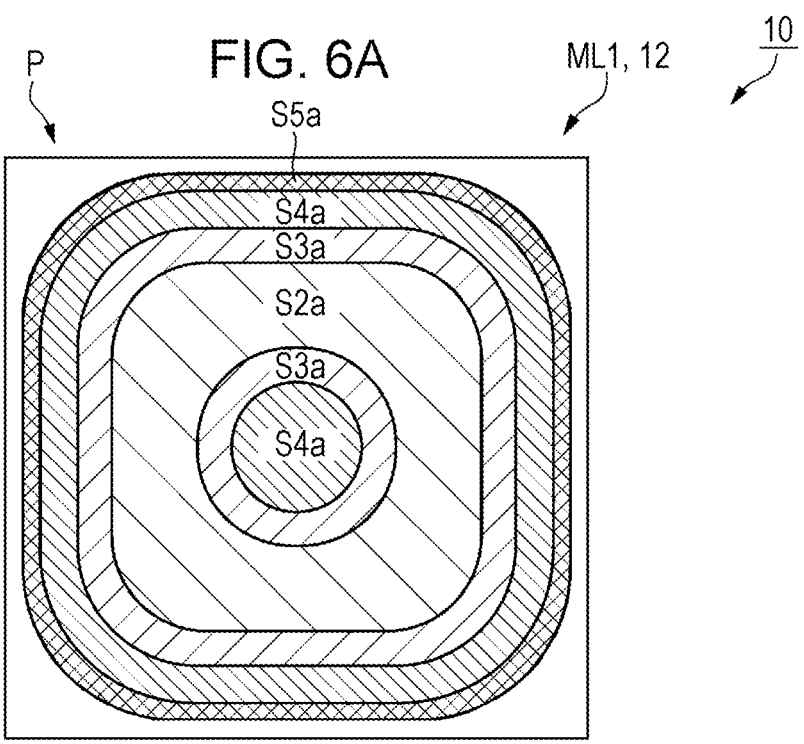
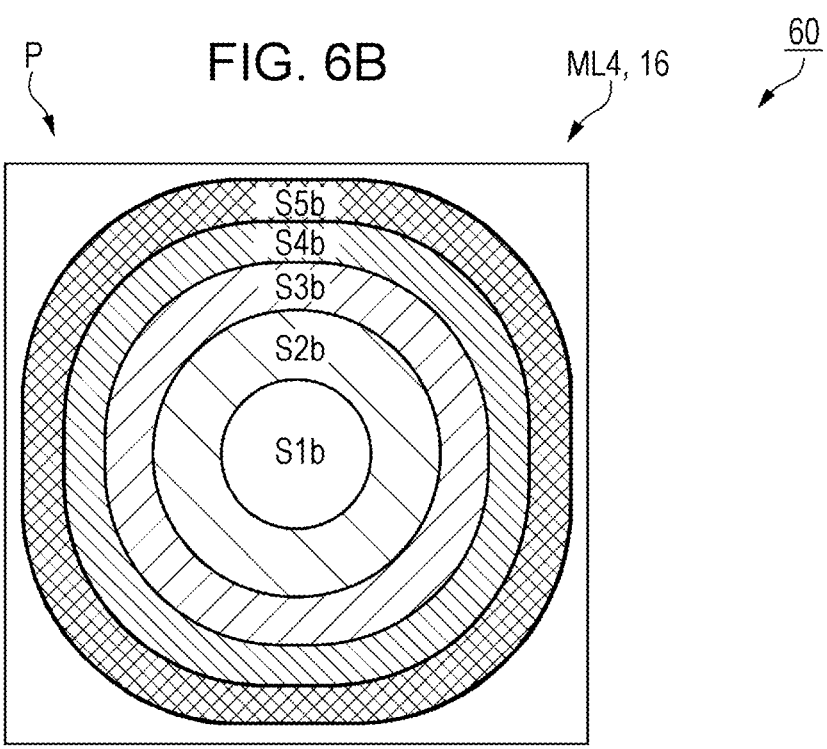

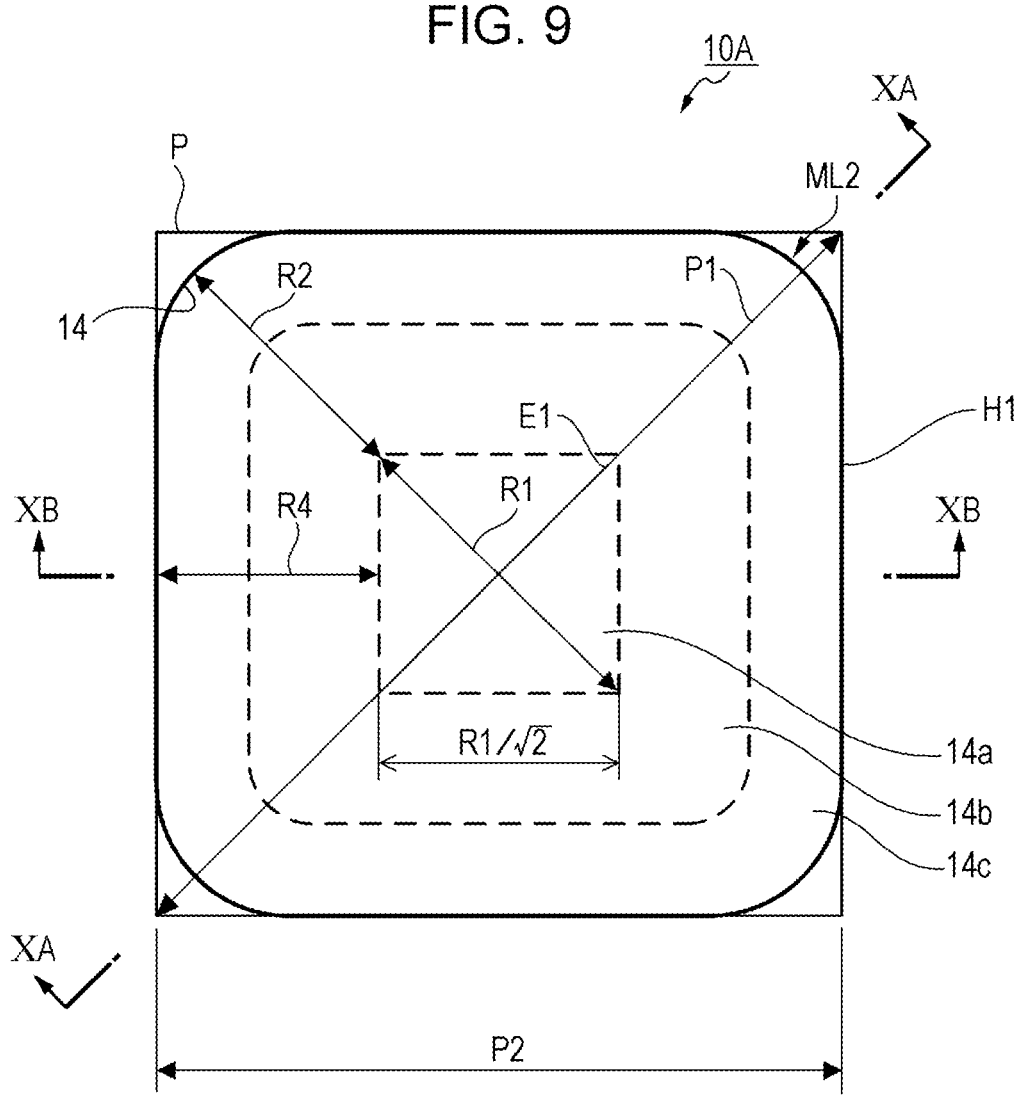

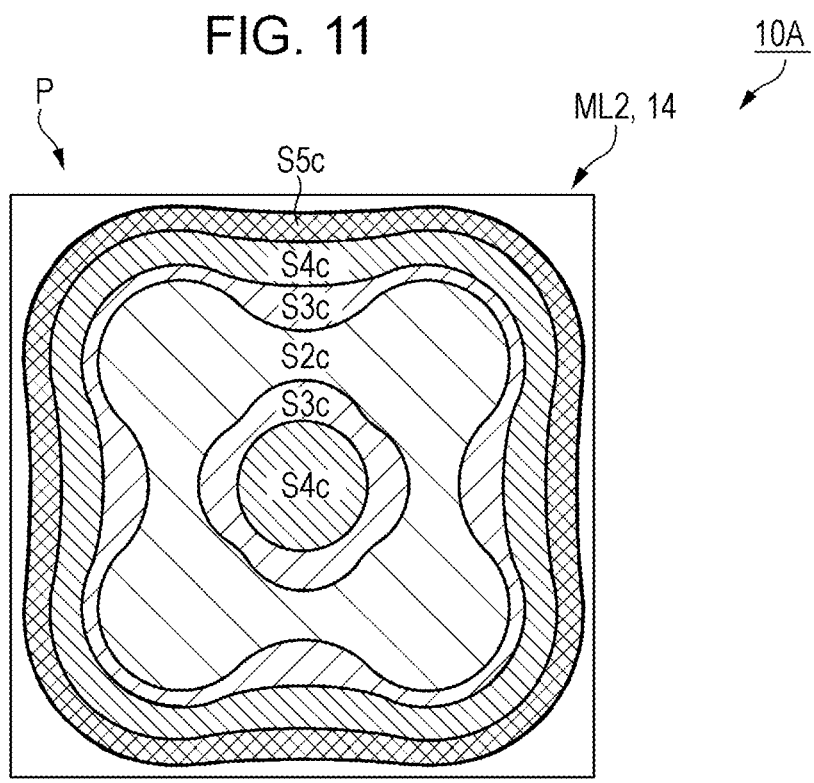

SHAPE OF FLAT PORTION AND LIGHT UTILIZATION EFFICIENCY

SIZE OF FLAT PORTION AND LIGHT UTILIZATION EFFICIENCY

MICROLENS ARRAY SUBSTRATE, ELECTRO-OPTIC DEVICE, AND ELECTRONIC APPARATUS

BACKGROUND

1. Technical Field

The present invention relates to a microlens array substrate, an electro-optic device, and an electronic apparatus.

2. Related Art

An electro-optic device has been known that is provided with an electro-optic material (for example, liquid crystal and the like) between an element substrate and an opposite substrate. A liquid crystal device that is used as a liquid crystal light valve of a projector is an example of the electro-optic device. An attempt has been made to realize high light utilization efficiency for such a liquid crystal device.

For example, a configuration has been known in which at least one of the element substrate and the opposite substrate of the liquid crystal device is the microlens array substrate and light blocked by a light blocking layer among light incident on the liquid crystal device is condensed by the microlens so as to make the light incident on an opening region of a pixel. The configuration accomplishes a substantial improvement in an aperture rate of the liquid crystal device. The microlens array substrate includes a substrate made of quartz, inorganic glass, or the like, on which plural concave portions are formed on the surface, and a lens layer having a different refractive index from that of the substrate, which is formed so as to fill a concave portion covering the substrate (for example, refer to JP-A-2004-4745).

On the microlens array substrate disclosed in JP-A-2004-4745, the concave portion (recess) of the substrate is filled with a lens layer made of an adhesive having a high refractive index. When isotropic etching processing is performed on the substrate through a mask layer to form the concave portion, unnecessary substances generated by the reaction between the substrate and the etching liquid are accumulated on the substrate surface of the concave portion. Therefore, the unnecessary substances accumulated in the concave portion cover the substrate surface and hinder circulation of the etching liquid. Thus, while the edge portion of the concave portion is formed almost spherically, the center portion of the concave portion is formed almost flat, and etching stops in this state.

However, when the edge portion of the microlens (concave portion) is formed almost spherically as described in JP-A-2004-4745, the angle between the tangent of the edge portion and the surface of the substrate in the cross section passing through the center portion of the concave portion is nearly 90°. Therefore, light incident on the edge portion of the microlens (concave portion) along a normal direction of the surface of the substrate is refracted significantly with respect to the normal direction due to a difference between the refractive index of the substrate and the refractive index of the lens layer. As a result, when the angle of the light refracted in the edge portion of the microlens is larger than an angle at which light can be incident on a region of a corresponding pixel, the light is blocked by a light blocking layer arranged between the pixel and an adjacent pixel. Then, the light utilization efficiency is not improved as desired and there is a concern of a display of the liquid crystal device becoming dark. In addition, when the angle of the light refracted in the edge portion of the microlens is increased, the angle of the light passing through the microlens and being incident on a liquid crystal layer with respect to an orientation direction of the liquid crystal varies significantly at the center portion and the edge portion, and thus, there is a concern of causing deterioration of contrast in the liquid crystal device.

SUMMARY

The invention can be realized in the following forms or application examples.

Application Example 1

According to this application example, there is provided a microlens array substrate including a substrate having transparency and having a plurality of concave portions provided on a first surface to correspond to a plurality of pixels, and a lens layer having a different refractive index from a refractive index of the substrate, which is provided on the first surface of the substrate to fill in the plurality of concave portions, in which each of the plurality of concave portions has a flat portion arranged at the center portion, a curved surface portion arranged to surround the flat portion, an edge portion arranged to surround the curved surface portion and connected to the first surface of the substrate, and an angle between the edge portion and the first surface in a cross section passing through the center portion is smaller than an angle between a virtual curved surface, obtained by extending the curved surface portion toward the first surface, and the first surface.

According to the configuration of the application example, the plurality of microlenses are configured by filling the plurality of concave portions with the lens layer having a different refractive index from a refractive index of the substrate. Among light incident on each microlens (concave portion) along the normal direction of the first surface of the substrate, the light incident on the flat portion is not refracted and passes through the microlens as it is and is incident on an opening region of the pixel. The light incident on the vicinity of the flat portion is condensed by the curved surface portion and is incident on the opening region of the pixel. In addition, the light incident on the vicinity of the curved surface portion is refracted or condensed by the edge portion and is incident on the opening region of the pixel. Accordingly, the light, which is incident on the outer side of the center portion of the microlens along the normal direction of the first surface and is not incident on the opening region of the pixel, when the light propagates straight as it is, also is incident on the opening region of the pixel, and thus, light utilization efficiency is improved.

Here, an angle between the edge portion and the first surface is smaller than an angle between the virtual curved surface obtained by extending the curved surface portion toward the first surface and the first surface. That is, the angle between the edge portion and the first surface is small compared to a case in which the edge portion is formed almost spherically, and thus, excessive refraction in the edge portion is suppressed and an amount of light blocked by a light blocking layer arranged between the pixel and an adjacent pixel can be reduced. Thus, light utilization efficiency can be further improved. In addition, since a difference between the angle of the light refracted in the edge portion and the angle of the light refracted in the curved surface portion is decreased, it is possible to make the light incident on the center portion of the microlens not be refracted and to reduce variation in the angle of the light passing through the microlens to be emitted. Thus, for example, a liquid crystal device including the microlens array substrate according to the application example can obtain a bright display and good contrast.

Application Example 2

In the microlens array substrate according to the application example, it is preferable that the edge portion be an inclined surface inclined from the first surface toward the curved surface portion in the cross section.

According to the configuration of the application example, the edge portion is an inclined surface inclined from the first surface of the substrate toward the curved surface portion, that is, is formed in a tapered shape in the cross section passing through the center portion of the concave portion. Accordingly, the refractive angle of the light incident on the edge portion is almost the same in the entire edge portion. Therefore, it is possible to reduce variation in the angle of the light passing through the microlens to be emitted.

Application Example 3

In the microlens array substrate according to the application example, the flat portion may have an almost circular shape as seen from a plan view.

According to the configuration of the application example, when the flat portion has an almost circular shape as seen from a plan view, the curved surface portion having a light condensing effect is annularly distributed around the flat portion.

Application Example 4

In the microlens array substrate according to the application example, the flat portion may have an almost rectangular shape as seen from a plan view.

According to the configuration of the application example, when the flat portion has an almost rectangular shape as seen from a plan view, the curved surface portion having a light condensing effect is distributed at the corner of the flat portion.

Application Example 5

In the microlens array substrate according to the application example, it is preferable that the depth of the flat portion be smaller than a ½ length of a diagonal line of the pixel.

According to the configuration of the application example, since the depth of the flat portion is smaller than a ½ length of a diagonal line of the pixel, the depth of the concave portion can be made shallower than the depth of the spherical concave portion having a ½ length of the diagonal line of the pixel as a radius even when the planar area of the concave portion is the same as the area of the spherical concave portion. Accordingly, the amount of the substrate etched can be reduced in a process of forming the concave portion on the first surface of the substrate, and the amount of the lens layer deposited can be reduced in a process of forming the lens layer so as to fill in the concave portion. Further, since the depth of the concave portion is made shallow, a step difference between the first surface of the substrate and the concave portion is decreased, and the amount of polishing can be reduced in a process of flattening an upper surface of the lens layer formed so as to fill in the concave portion by CMP processing. Therefore, the number of processes and the amount of materials used can be reduced in the manufacturing process of the microlens array substrate.

Application Example 6

In the microlens array substrate according to the application example, it is preferable that the maximum length of the flat portion in the cross section passing through the center portion be 10% or more of the arrangement pitch of the plurality of pixels.

According to the configuration of the application example, since the maximum length of the flat portion in the cross section passing through the center portion is 10% or more of the arrangement pitch of the plurality of pixels, the area of the flat portion with respect to the opening region of the pixel is increased, and the amount of light not refracted and passing through the center portion of light incident on the microlens along the normal direction can be increased. Therefore, variation in the angle of the light passing through the microlens to be emitted can be further reduced.

Application Example 7

According to this application example, there is provided an electro-optic device including a first substrate, a second substrate arranged opposite to the first substrate, and an electro-optic layer arranged between the first substrate and the second substrate, in which at least one of the first substrate and the second substrate is the microlens array substrate according to the application examples.

According to the configuration of the application example, since light utilization efficiency can be improved and the microlens array substrate having a small difference between the angle of the light refracted in the edge portion and the angle of the light refracted in the curved surface portion is provided, it is possible to provide the electro-optic device having a bright display and excellent contrast.

Application Example 8

According to this application example, there is provided an electronic apparatus including the electro-optic device according to the application example.

According to the configuration of the application example, it is possible to provide the electronic apparatus having a bright display and excellent contrast.

BRIEF DESCRIPTION OF THE DRAWINGS

The invention will be described with reference to the accompanying drawings, wherein like numbers reference like elements.

FIG. 2 is an equivalent circuit diagram illustrating an electrical configuration of the liquid crystal device according to the first embodiment.

FIG. 3 is a schematic cross-sectional view illustrating the configuration of the liquid crystal device according to the first embodiment.

FIG. 4 is a schematic plan view illustrating a configuration of a microlens according to the first embodiment.

FIGS. 6A to 6B are schematic views illustrating an action of the microlens according to the first embodiment.

FIG. 9 is a schematic plan view illustrating a configuration of a microlens according to a second embodiment.

FIG. 11 is a schematic view illustrating an action of the microlens according to the second embodiment.

DESCRIPTION OF EXEMPLARY EMBODIMENTS

Figure 1:
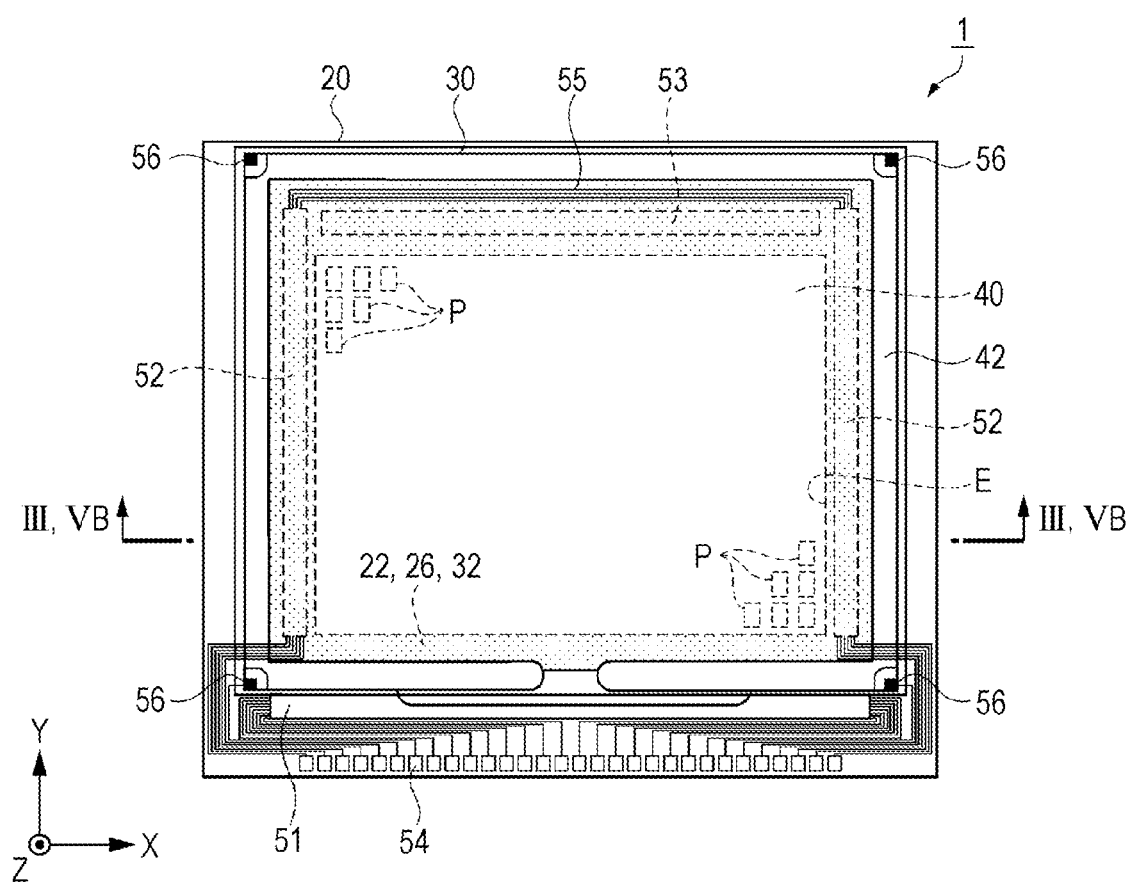
FIG. 1 is a schematic plan view illustrating a configuration of a liquid crystal device according to a first embodiment.

Embodiments that realize the invention will be described below referring to the drawings. The drawings referred to illustrate portions to be described in a properly-enlarged, reduced, or excessively-enlarged state so that the portions are made recognizable. Furthermore, there are cases where illustrations of constituent elements other than those necessary for descriptions of the embodiments are omitted.

In addition, according to the embodiments described below, for example, a case where a description "on the substrate" is provided is defined to mean that a given constituent component is arranged on the substrate so as to come into contact with the substrate, or that the given constituent component is arranged on the substrate with another constituent component in-between, or that one part of the given constituent component is arranged on the substrate so as to come into contact with the substrate, and another part of the given constituent component is arranged on the substrate with another component in-between.

First Embodiment

Electro-Optic Device

As an example of an electro-optic device, an active matrix type liquid crystal device, provided with a thin film transistor (TFT) as a switching element of a pixel, is described. The liquid crystal device can be suitably used, for example, as a light modulation element (a liquid crystal light valve) of a projection type display apparatus (a projector) described below.

First, the liquid crystal device as the electro-optic device according to a first embodiment is described referring to FIGS. 1, 2, and 3. FIG. 1 is a schematic plan view illustrating a configuration of the liquid crystal device according to the first embodiment. FIG. 2 is an equivalent circuit diagram illustrating an electrical configuration of the liquid crystal device according to the first embodiment. FIG. 3 is a schematic cross-sectional view illustrating a configuration of the liquid crystal device according to the first embodiment. Specifically, FIG. 3 is a schematic cross-sectional view taken along the line III-III in FIG. 1.

As illustrated in FIGS. 1 and 3, a liquid crystal device 1 according to the first embodiment includes an element substrate 20 as a first substrate, an opposite substrate 30 as a second substrate, which is arranged opposite to the element substrate 20, a sealant 42, and a liquid crystal layer 40 as an electro-optic layer. As illustrated in FIG. 1, the size of the element substrate 20 is larger than the size of the opposite substrate 30, and both substrates are bonded to each other with the sealant 42 arranged in the shape of a frame along the edge of the opposite substrate 30.

The liquid crystal layer 40 is configured from liquid crystal that is enclosed within a space surrounded by the element substrate 20, the opposite substrate 30, and the sealant 42 and has positive or negative dielectric anisotropy. For example, the sealant 42 is made from an adhesive such as a heat-curable or ultraviolet-curable epoxy resin. A spacer (not illustrated) for uniformly maintaining a space between the element substrate 20 and the opposite substrate 30 is mixed into the sealant 42.

Light blocking layers 22 and 26 on the element substrate 20 and a light blocking layer 32 on the opposite substrate 30 are provided inside the sealant 42 arranged in the shape of a frame. The light blocking layers 22, 26, and 32 have a frame-like edge and are made of, for example, light blocking metal or metallic oxide. Inside the light blocking layers 22, 26, and 32, a display region E on which plural pixels P are arranged is formed. For example, the pixels P having an almost rectangular shape are arranged into the shape of a matrix.

The display region E is a region which substantially contributes to the display in the liquid crystal device 1. The light blocking layer 22 and the light blocking layer 26 provided in the element substrate 20 are in the display region E, for example, in the shape of a lattice, in such a manner as to planarly partition the plural pixels P. The liquid crystal device 1 may include a dummy region which is provided so as to surround the display region E and does not substantially contribute to the display.

A data line drive circuit 51 and plural external connection terminals 54 are provided on the opposite side of the display region E of the sealant 42 formed along a first side of the element substrate 20, along the first side. Further, an inspection circuit 53 is provided on the side of the display region E of the sealant 42 formed along another second side opposite to the first side. Furthermore, a scan line drive circuit 52 is provided inside the sealant 42 along the other two sides opposite to each other, which are at right angles to the two sides.

Plural wiring lines 55 linking two scan line drive circuits 52 together are provided on the side of the display region E of the sealant 42 along the second side on which the inspection circuit 53 is provided. The wiring line linked to the data line drive circuit 51 and the scan line drive circuit 52 is connected to the plural external connection terminals 54. Furthermore, upper and lower conduction portions 56 for flowing electric current between the element substrate 20 and the opposite substrate 30 are provided on corner portions of the opposite substrate 30. Moreover, the inspection circuit 53 is not limited to this arrangement, and may be provided in a position along the inside of the sealant 42 between the data line drive circuit 51 and the display region E.

In the following description, a direction along the first side on which the data line drive circuit 51 is provided is defined as the X-direction, and a direction along other two sides opposite to each other, which are at right angles to the first side, is defined as the Y-direction. The X-direction is a direction along the line III-III in FIG. 1. The light blocking layers 22 and 26 are provided in the shape of a lattice along the X-direction and the Y-direction. The pixels P are partitioned in a shape of a lattice by the light blocking layers 22 and 26, and arranged in the shape of a matrix along the X-direction and the Y-direction.

Furthermore, a direction at right angles to the X-direction and the Y-direction, which faces upward in FIG. 1, is defined as the Z-direction. Moreover, in the present specification, a view from a normal direction (Z-direction) with respect to a surface of the liquid crystal device 1, which faces toward the opposite substrate 30, is defined as a "plan view."

As illustrated in FIG. 2, in the display region E, scan lines 2 and data lines 3 are formed so as to intersect each other, and the pixels P are provided corresponding to intersections between the scan lines 2 and the data lines 3. A pixel electrode 28 and a TFT 24 as the switching element are provided in each of the pixels P.

A source electrode (not illustrated) of the TFT 24 is electrically connected to the data line 3 extending from the data line drive circuit 51. Image signals (data signals) S1, S2, . . . , and Sn are supplied from the data line drive circuit 51 (refer to FIG. 1) to the data line 3, in a line sequential order. A gate electrode (not illustrated) of the TFT 24 is one part of the scan line 2 extending from the scan line drive circuit 52. Scan signals G1, G2, . . . , and Gm are supplied from the scan line drive circuit 52 to the scan line 2, in a line sequential order. A drain electrode (not illustrated) of the TFT 24 is electrically connected to the pixel electrode 28.

The image signals S1, S2, . . . , and Sn are written into the pixel electrode 28 through the data line 3 at a predetermined timing by making the TFT 24 in an ON state only for a given period of time. The image signal at a predetermined level, which is written to a liquid crystal layer 40 through the pixel electrode 28 in this manner is retained for a given period time in a liquid crystal capacitor formed between the liquid crystal layer and a common electrode 34 (refer to FIG. 3) provided to the opposite substrate 30.

Moreover, in order to prevent the image signals S1, S2, . . . , and Sn from leaking, a storage capacitor 5 is formed between a capacitance line 4 formed along the scan line 2 and the pixel electrode 28 and is arranged in parallel with the liquid crystal capacitor. When a voltage signal is applied to liquid crystal in each pixel P in this manner, an orientation state of the liquid crystal changes by a level of applied voltage. Because of this, light incident on the liquid crystal layer 40 (refer to FIG. 3) is modulated, and thus gradation display is made possible.

Orientation and regularity of molecular association are changed by the level of an applied voltage, and thus, the liquid crystal configuring the liquid crystal layer 40 modulates light and the gradation display is made possible. For example, in a case of a normally white mode, transmissivity with respect to incident light is decreased depending on the voltage applied in a unit of each pixel P. In a case of a normally black mode, the transmissivity with respect to the incident light is increased depending on the voltage applied in a unit of each pixel P, and light with contrast that depends on the image signal is emitted from the liquid crystal device 1 as a whole.

As illustrated in FIG. 3, the opposite substrate 30 according to the first embodiment includes a microlens array substrate 10, an optical path length adjusting layer 31, a light blocking layer 32, a protective layer 33, a common electrode 34, and an orientation film 35.

The microlens array substrate 10 includes a substrate 11, and a lens layer 13. For example, the substrate 11 is made of inorganic material having optical transparency such as glass or quartz. A surface of the substrate 11 on the side of the liquid crystal layer 40 is defined as an upper surface 11a as a first surface. The substrate 11 has plural concave portions 12 that are formed on the upper surface 11a. Each concave portion 12 is provided corresponding to each pixel P. The concave portion 12 has a flat portion 12a arranged at the center portion, a curved surface portion 12b arranged around the flat portion 12a, and an edge portion 12c (refer to FIG. 5A). The shape of the concave portion 12 will be described in detail later.

The lens layer 13 is provided so as to cover the upper surface 11a of the substrate 11. The lens layer 13 is formed to be thicker than the depth of the concave portion 12 and formed so as to fill in the plural concave portions 12. The lens layer 13 is made of a material having optical transparency and having a different refractive index from that of the substrate 11. More specifically, the lens layer 13 is made of an inorganic material having a higher light refractive index than that of the substrate 11. Examples of the inorganic material include SiON, and $Al_2O_3$.

A convex microlens ML1 is configured by the concave portion 12 being filled in with the lens layer 13. Therefore, each microlens ML1 is provided corresponding to each pixel P. Furthermore, a microlens array MLA is configured by the plural microlens ML1. The surface of the microlens array substrate 10, that is, the surface of the lens layer 13 is almost flat.

The optical path length adjusting layer 31 is provided so as to cover the microlens array substrate 10. The optical path length adjusting layer 31 is made of an inorganic material having optical transparency and, for example, almost the same material as the material of the substrate 11. The optical path length adjusting layer 31 has a function of adjusting a distance from the microlens ML1 to the light blocking layer 26 to a predetermined value. Accordingly, the thickness of the optical path length adjusting layer 31 is appropriately set based on optical conditions such as a focal distance of the microlens ML1 according to a wavelength of light.

The light blocking layer 32 is provided on the optical path length adjusting layer 31. The light blocking layer 32 is provided so as to surround the display region E (refer to FIG. 1) in which the microlens ML1 is arranged. The light blocking layer 32 may be also provided inside the display region E, for example, in the shape of a lattice, in which the light blocking layer 22 and the light blocking layer 26 of the element substrate 20 overlap as seen from a plan view, an island, or a stripe.

The protective layer 33 is provided so as to cover the optical path length adjusting layer 31 and the light blocking layer 32. The common electrode 34 is formed so as to cover the protective layer 33. The common electrode 34 is formed so as to straddle the multiple pixels P. For example, the common electrode 34 is made of a transparent conductive film such as indium tin oxide (ITO) or indium zinc oxide (IZO). The orientation film 35 is provided so as to cover the common electrode 34.

Moreover, the protective layer 33 covers the light blocking layer 32 so as to flatten a surface of the common electrode 34 on the side of the liquid crystal layer 40, but this is not an essential constituent element. For example, the common electrode 34 may be formed so as to directly cover the light blocking layer 32 having conductivity.

The element substrate 20 includes a substrate 21, the light blocking layer 22, an insulating layer 23, the TFT 24, an insulating layer 25, the light blocking layer 26, an insulating layer 27, the pixel electrode 28, and an orientation film 29. The substrate 21 is made of a material having optical transparency such as glass or quartz.

The light blocking layer 22 is provided on the substrate 21. The light blocking layer 22 is formed in the shape of a lattice so as to overlap the light blocking layer 26 over the light blocking layer as seen from a plan view. The light blocking layer 22 and the light blocking layer 26 are arranged so as to interpose the TFT 24 between the light blocking layers along the thickness direction (in the Z-direction) of the element substrate 20. The light blocking layer 22 overlaps at least a channel region of the TFT 24 as seen from a plan view.

The providing of the light blocking layer 22 and the light blocking layer 26 suppresses light incident on the TFT 24. A region (within an opening portion 22a) surrounded by the light blocking layer 22 and a region (within an opening portion 26a) by the light blocking layer 26 are regions that overlap each other as seen from a plan view and allow light to pass through. The region of the pixel P in which the opening portion 22a and the opening portion 26a overlap each other is referred to as an opening region of the pixel P.

The insulating layer 23 is provided so as to cover the substrate 21 and the light blocking layer 22. The insulating layer 23 is made of an inorganic material such as $SiO_2$.

The TFT 24 is provided on the insulating layer 23. The TFT 24 is the switching element that drives the pixel electrode 28. The TFT 24 is configured with a semiconductor layer (not illustrated), the gate electrode, the source electrode, and the drain electrode. A source region, a channel region, and a drain region are formed on the semiconductor layer. A lightly doped drain (LDD) region may be formed at the interface between the channel region and the source region or between the channel region and the drain region.

The gate electrode is formed in a region that overlaps the channel region of the semiconductor layer in the element substrate 20 as seen from a plan view, with one part (gate insulating film) of the insulating layer 25 in-between. Although the illustration is omitted, the gate electrode is electrically connected to the scan line arranged under the gate electrode with a contact hall in-between and on/off-controls the TFT 24 by applying the scan signal.

The insulating layer 25 is provided so as to cover the insulating layer 23 and the TFT 24. For example, the insulating layer 25 is made of an inorganic material such as $SiO_2$. The insulating layer 25 includes the gate insulating film that insulates the semiconductor layer and the gate electrode of the TFT 24. The insulating layer 25 alleviates surface irregularity that results from the TFT 24. The light blocking layer 26 is provided on the insulating layer 25. Then, the insulating layer 27 made of an inorganic material is provided so as to cover the insulating layer 25 and the light blocking layer 26.

The pixel electrode 28 is provided on the insulating layer 27 to correspond to the pixel P. The pixel electrode 28 is arranged in a region that overlaps the opening portion 22a of the light blocking layer 22 and the opening portion 26a of the light blocking layer 26 as seen from a plan view. For example, the pixel electrode 28 is made of a transparent conductive film such as indium tin oxide (ITO) or indium zinc oxide (IZO). The orientation film 29 is provided so as to cover the pixel electrode 28. The liquid crystal layer 40 is enclosed between the orientation film 29 on the side of the element substrate 20 and the orientation film 35 on the side of the opposite substrate 30.

Moreover, the TFT 24, and the electrode, the wiring line, or the like (not illustrated) through which an electric signal is supplied to the TFT 24 are provided in a region that overlaps the light blocking layer 22 and the light blocking layer 26 as seen from a plan view. A configuration may be provided in which the electrode, the wiring line, or the like serves also as the light blocking layer 22 and the light blocking layer 26.

In the liquid crystal device 1 according to the first embodiment, light emitted from, for example, a light source or the like is incident on the side of the opposite substrate 30 (substrate 11) including the microlens ML1 and is condensed by the microlens ML1. For example, among light incident on the microlens ML1 from the side of the substrate 11 along the normal direction of the upper surface 11a, incident light L1 incident on the flat portion 12a of the concave portion 12 propagates straight through the microlens ML1 as it is, passes through the liquid crystal layer 40, and is then emitted to the side of the element substrate 20.

Incident light L2 incident on the outer side (the curved surface portion 12b and the edge portion 12c) of the flat portion 12a of the microlens ML1 from a region that overlaps the light blocking layer 26 as seen from a plan view in a more outward direction than in the case of the incident light L1, when the light propagates straight as it is, is blocked by the light blocking layer 26 as indicated by dashed lines, but is refracted to the planar center side of the pixel P due to a difference between the optical refractive index of the substrate 11 and the optical refractive index of the lens layer 13. In the liquid crystal device 1, the incident light L2 that, when the light propagates straight in this manner, is also blocked by the light blocking layer 26 is incident on the opening portion 26a of the light blocking layer 26 due to the action of the microlens ML1 and thus can pass through the liquid crystal layer 40. As a result, since an amount of light emitted from the side of the element substrate 20 can be increased, it is possible to increase the light utilization efficiency.

Microlens

Figure 5A:
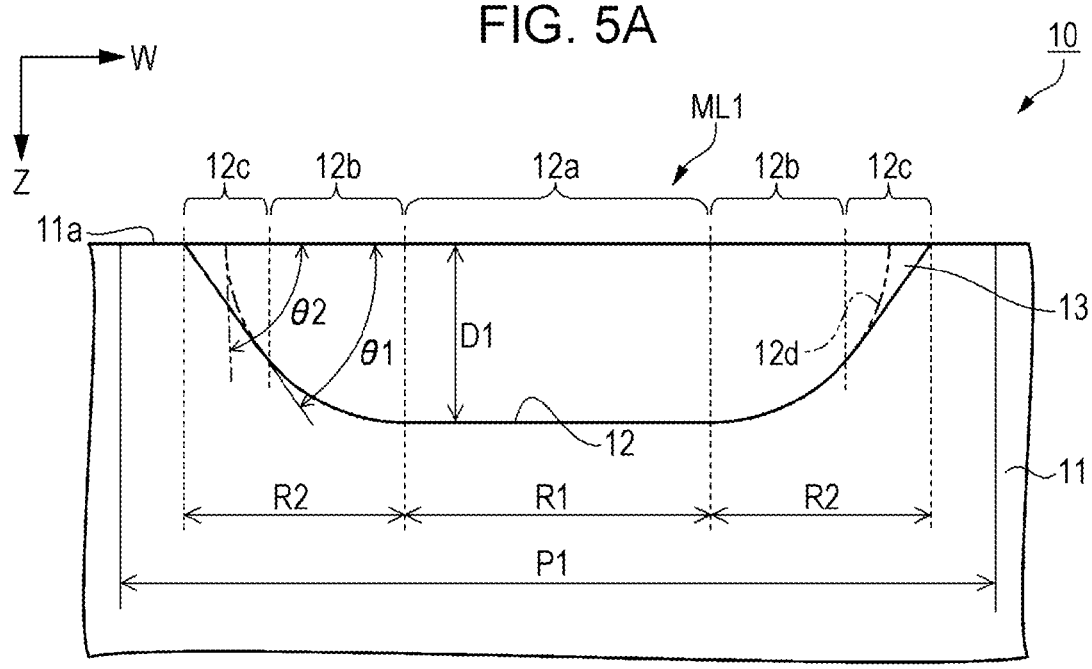
FIGS. 5A and 5B are schematic cross-sectional views illustrating the configuration of the microlens according to the first embodiment.
Figure 5B:
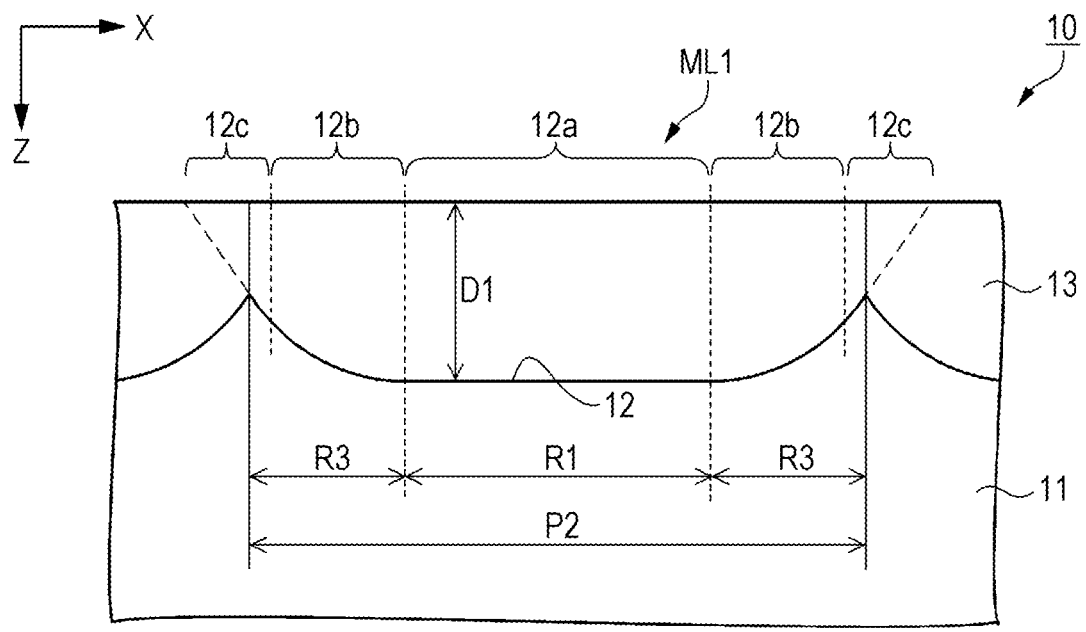

Subsequently, a configuration and an action of the microlens ML1 included in the microlens array substrate 10 according to the first embodiment will be described referring to FIGS. 4, 5A, 5B, 6A, and 6B. FIG. 4 is a schematic plan view illustrating a configuration of the microlens according to the first embodiment. FIGS. 5A and 5B are schematic cross-sectional views illustrating the configuration of the microlens according to the first embodiment. Specifically, FIG. 5A is a schematic cross-sectional view taken along the line VA-VA of FIG. 4, and FIG. 5B is a schematic cross-sectional view taken along the line VB-VB of FIG. 4.

Figure 15A:
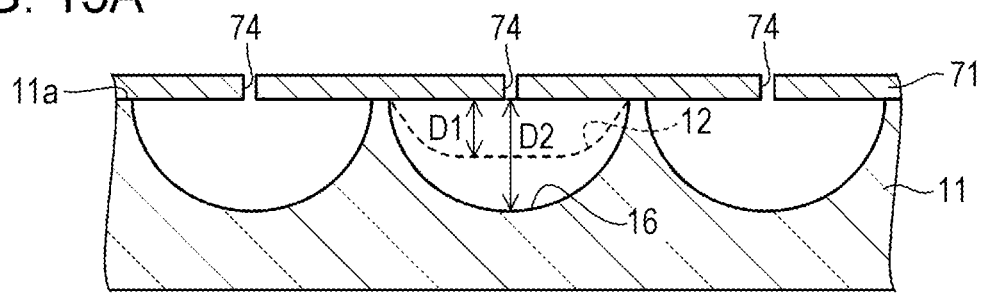
FIGS. 15A to 15C are schematic cross-sectional views illustrating an example of a configuration of a microlens and a method of manufacturing a microlens in the related art.
Figure 15B:
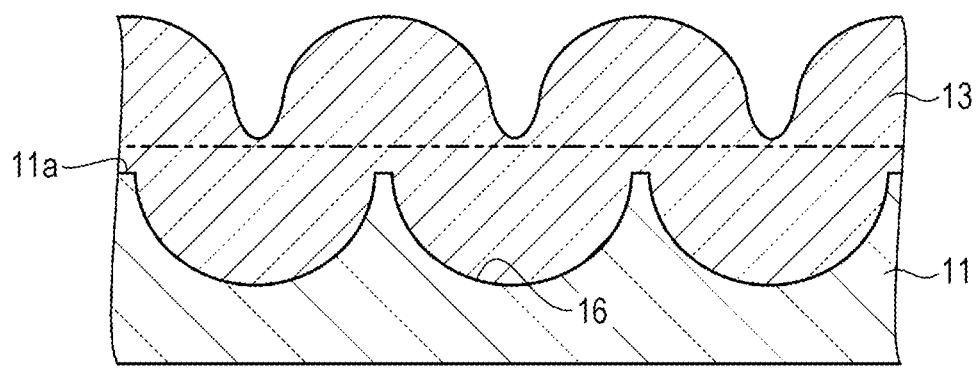
Figure 15C:
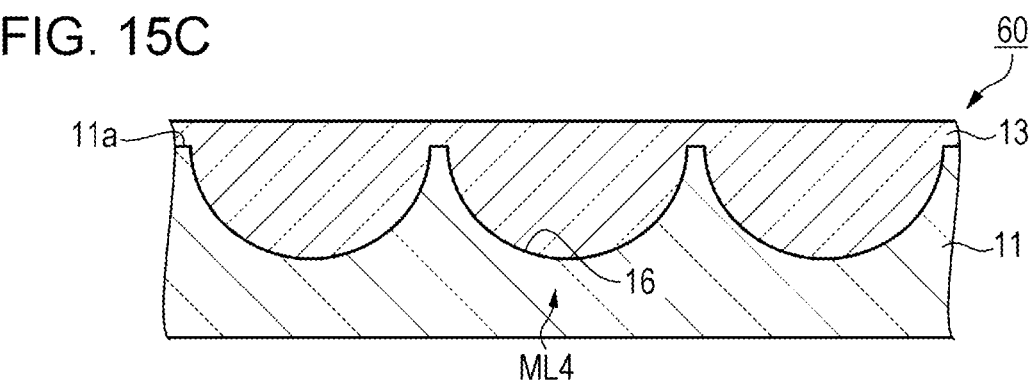

Further, FIGS. 6A and 6B are schematic views illustrating the light condensing effect of the microlens according to the first embodiment. Specifically, FIG. 6A is a schematic view illustrating a condensed state of light of the microlens according to the first embodiment, and FIG. 6B is a schematic view illustrating a condensed state of light of a microlens of the related art. FIGS. 15A to 15C are schematic cross-sectional views illustrating an example of a configuration of a microlens and a method of manufacturing the microlens in the related art. Each of FIGS. 15A to 15C corresponds to the schematic cross-sectional view taken along the line XV-XV of FIG. 4.

In FIG. 4, one pixel P is illustrated. As illustrated in FIG. 4, the pixel P has an almost rectangular planar shape. The plural pixels P having such a shape are arranged so that adjacent pixels P come into contact with each other in the X-direction and the Y-direction. Although not illustrated in FIG. 4, the light blocking layers 22 and 26 (refer to FIG. 3) are arranged along a boundary between the adjacent pixels P in the X-direction and the Y-direction.

The length of the diagonal line of the pixel P is defined as P1, and the length of one side of the pixel P in the X-direction is defined as P2. The arrangement pitch of the pixel P in the X-direction is P2. For example, when the planar shape of the pixel P is a rectangular shape and the arrangement pitch P2 of the pixel P is 10 μm, the length P1 of the diagonal line of the pixel P is about 14 μm. A direction along the diagonal line of the pixel P is defined as a W-direction. The W-direction is a direction to interest the X-direction and the Y-direction on the plan surface formed by the X-direction and the Y-direction.

The concave portion 12 forming the shape of the microlens ML1 in the microlens array substrate 10 according to the first embodiment has an almost circular planar shape virtually indicated by a two-dot chain line. For example, the virtual external shape of the concave portion 12 is larger than an inscribed circle of the pixel P and is smaller than a circumscribed circle of the pixel.

In the microlens array substrate 10, the plural concave portions 12 are arranged so that adjacent concave portions 12 in the X-direction and the Y-direction come into contact with each other. Accordingly, adjacent concave portions 12 in the X-direction and the Y-direction are connected to each other. On the other hand, adjacent concave portions 12 in the W-direction are separated from each other.

The concave portion 12 has the flat portion 12a arranged at the center portion, the curved surface portion 12b arranged around the flat portion 12a, and the edge portion 12c arranged around the curved surface portion 12b. The flat portion 12a, the curved surface portion 12b, and the edge portion 12c are continuously formed. The flat portion 12a is a bottom portion of the concave portion 12 and has an almost circular planar shape. The diameter of the flat portion 12a is defined as R1. The virtual external shapes of the flat portion 12a, the curved surface portion 12b, and the edge portion 12c are formed concentrically with the planar center of the pixel P as the center of the concave portion 12.

A distance from the flat portion 12a to the outer edge of the edge portion 12c is defined as R2 in a direction along the W-direction (diagonal line) in which the diameter of the concave portion 12 becomes maximum in the region of the pixel P. The maximum diameter of the concave portion 12 is R1+R2×2 and is smaller than the length P1 of the diagonal line of the pixel P. In addition, when a distance from the flat portion 12a to the outer edge of the edge portion 12c (outer edge of the pixel P) is defined as R3 in a direction along the X-direction in which the diameter of the concave portion 12 becomes minimum in the region of the pixel P, R3 is smaller than R2 and R3=(P2−R1)/2 is established.

FIG. 5A illustrates a cross section taken along the W-direction in FIG. 4. FIG. 5B illustrates a cross section taken along the X-direction in FIG. 4 and corresponds to a cross section taken along the line VB-VB of FIG. 1. FIGS. 5A and 5B are cross sections passing through the planar center of the pixel P. FIGS. 5A and 5B are views in which FIG. 3 is vertically (Z-direction) reversed. Accordingly, although not illustrated, light is incident on the microlens ML1 from the lower side to the upper side in FIGS. 5A and 5B.

As illustrated in FIGS. 5A and 5B, the flat portion 12a is almost parallel with the upper surface 11a of the substrate 11 and is almost flat. The flat portion 12a does not have a light condensing function. Accordingly, the light incident on the flat portion 12a along the normal direction of the upper surface 11a passes through the flat portion as it is. The light incident on the flat portion 12a positioned at the center portion of the pixel P, even when the light propagates straight as it is, is not blocked by the light blocking layer 26 (refer to FIG. 3), and thus, the light may not be condensed into the planar center side of the pixel P.

Further, since the light incident on the flat portion 12a is not condensed into the planar center side of the pixel P, variation in the angle of the light passing through the liquid crystal layer 40 (refer to FIG. 3) at the center portion of the pixel P is suppressed compared to a microlens ML4 (refer to FIG. 15C) including an almost spherical concave portion 16 of the related art, having a light condensing function over the overall region. Thus, variation in the angle of the light with respect to the orientation direction of liquid crystal molecules of the liquid crystal layer 40 is reduced and therefore, the contrast of the liquid crystal device 1 is improved.

The curved surface portion 12b is provided continuously to the flat portion 12a and has an ark-like cross section shape. The curved surface portion 12b has a light condensing function and the light incident on the curved surface portion 12b along the normal direction of the upper surface 11a is condensed into the planar center side of the pixel P. Accordingly, it is possible to allow the light, which is incident on the outer side of the center portion of the pixel P and is blocked by the light blocking layer 26 when the light propagates straight as it is, to be incident on the opening region of the pixel P by the curved surface portion 12b.

The edge portion 12c is provided continuously to the curved surface portion 12b. The edge portion 12c is connected to the upper surface 11a in the W-direction and is connected to an edge portion 12c of an adjacent concave portion 12 in the X-direction. The edge portion 12c is an inclined surface inclined from the upper surface 11a toward the curved surface portion 12b, that is, has a so-called tapered shape. Accordingly, since the light incident on the edge portion 12c along the normal direction of the upper surface 11a is refracted to the planar center side of the pixel P, it is possible to allow the light blocked by the light blocking layer 26 when the light propagates straight as it is to be incident on the opening region of the pixel P.

The edge portion 12c does not have a light condensing function. Accordingly, since the light incident on the edge portion 12c along the normal direction of the upper surface 11a is refracted at almost the same angle, it is possible to suppress variation in the angle of the light incident on the liquid crystal layer 40.

As illustrated in FIG. 5A, an angle between the edge portion 12c and the upper surface 11a is defined as θ1. In FIG. 5A, a virtual curved surface 12d obtained by extending the curved surface portion 12b toward the upper surface 11a is indicated by a two-dot chain line. The virtual curved surface 12d is an almost spherically curved surface generally formed by isotropic etching. When an angle between a tangent at the end portion of the virtual curved surface 12d and the upper surface 11a is defined as θ2, θ1 is smaller than θ2. In the embodiment, for example, θ1 is about 35° to 70°. On the other hand, for example, θ2 is nearly 90°. Further, even in the microlens ML4 including an almost spherical concave portion 16 of the related art, an angle between the end portion thereof and the upper surface 11a is nearly 90°. Here, θ1 can be appropriately set based on a difference between the refractive index of the substrate 11 and the refractive index of the lens layer 13.

As the angle θ1 between the edge portion 12c and the upper surface 11a is increased, the light incident on the edge portion 12c along the normal direction of the upper surface 11a is significantly refracted. As the refraction angle of the light is increased, the refracted light is blocked by the light blocking layer 26 arranged between the pixel and an adjacent pixel P or is incident on an opening region of an adjacent pixel P in some cases. Since θ1 is smaller than θ2, excessive refraction of the light incident on the edge portion 12c is suppressed. In addition, since θ1 is smaller than θ2, a difference between the angle of the light refracted in the edge portion 12c and the angle of the light refracted in the curved surface portion 12b can be reduced.

In this manner, according to the configuration of the microlens ML1 included in the microlens array substrate 10 according to the first embodiment, the amount of light blocked by the light blocking layer 26 is increased and more light can be incident on the opening region of the pixel P compared to the microlens ML4 including the almost spherical concave portion 16 of the related art. Thus, the light utilization efficiency of the liquid crystal device 1 can be improved. Further, compared to the microlens ML4 of the related art, variation in the angle of the light passing through the microlens ML1 and being incident on the liquid crystal layer 40 can be reduced. Accordingly, the liquid crystal device 1 according to the first embodiment can obtain a brighter display and better contrast compared to a liquid crystal device of the related art.

Here, the diameter R1 that is the maximum length of the flat portion 12a of the concave portion 12 is preferably 10% or more of the arrangement pitch P2 of the pixel P. For example, when the arrangement pitch P2 of the pixel P is 10 µm, the diameter R1 of the flat portion 12a of the concave portion 12 is preferably 1 µm or more. By setting the maximum diameter R1 of the flat portion 12a to 10% or more of the arrangement pitch P2 of the pixel P, a region of the flat portion 12a through which the light passes without being condensed can be secured.

The larger the region of the flat portion 12a is relative to the arrangement pitch P2 of the pixel P, the more the light passes though the region of the flat portion without being condensed. Meanwhile, the smaller the curved surface portion 12b having the light condensing function is, the more the light utilization efficiency is decreased. Thus, the degree of the light utilization efficiency varies depending on the arrangement pitch P2 of the pixel P. The relationship between the size of the region of the flat portion 12a and light utilization efficiency will be described in the second embodiment.

The depth of the concave portion 12, that is, a distance from the upper surface 11a of the substrate 11 to the flat portion 12a in the Z-direction is defined as D1. In the embodiment, D1<P1/2 is established. For example, when the length P1 of the diagonal line of the pixel P is 14 µm, D1 is less than 7 µm. Then, it is preferable that D1<(R1+R2×2)/2 be established. Since D1<(R1+R2×2)/2 is established, the flat portion 12a can be provided. In addition, a load can be reduced in the manufacturing process of the microlens array substrate 10 by making the depth D1 of the concave portion 12 shallow. Regarding this point, a description will be made in a method of manufacturing the microlens array substrate 10.

Subsequently, the light condensing effect of the microlens ML1 according to the first embodiment will be described. FIG. 6A schematically illustrates illuminance distribution in the region of the pixel P of the microlens ML1 according to the first embodiment. FIG. 6A illustrates a case in which the maximum length R1 of the flat portion 12a is 50% of the arrangement pitch P2 of the pixel P. FIG. 6A illustrates illuminance with five stages of S1a, S2a, S1a, S4a, and S5a. Here, S1a is the highest illuminance, and illuminance is decreased in the order of S2a, S1a, S4a, and S5a.

FIG. 6B schematically illustrates illuminance distribution in the region of the pixel P of the almost spherical microlens ML4 of the related art. FIG. 6B illustrates illuminance with five stages of S1b, S2b, S1b, S4b, and S5b. Here, S1b is the highest illuminance, and illuminance is decreased in the order of S2b, S1b, S4b, and S5b.

As illustrated in FIG. 6B, in the almost spherical microlens ML4 of the related art, an almost spherical region at the center portion of the pixel P has the highest illuminance and regions in which the illuminance is decreased in the order from the center portion toward the outer edge is annularly distributed. When the light is concentrated at the center portion of the pixel P in this manner, a bright region is biased to the center portion in the region of the pixel P. Therefore, when the liquid crystal device including such a microlens ML4 is used as a liquid crystal light valve in a projector, brightness of an image to be displayed on a screen is not uniform. Further, since the light is concentrated on the center portion of the pixel P, displacement is easily recognized when displacement occurs between the opposite substrate 30 and the element substrate 20 and the liquid crystal of the liquid crystal layer 40 is easily deteriorated.

Contrarily, as illustrated in FIG. 6A, in the microlens ML1 according to the first embodiment, the center portion (flat portion 12a) of the microlens ML1 does not have a light condensing function, and thus, the center portions of the pixel P are S1a or S4a, which have relatively low illuminance. Then, an S2a region having higher illuminance than the center portions is annularly distributed around the center portion, and the S2a region is wider compared to the almost spherical microlens ML4 of the related art. Therefore, compared to the almost spherical microlens ML4 of the related art, more uniform brightness distribution can be obtained in the region of the pixel P, and thus, brightness of an image to be displayed on a screen becomes more uniform. In addition, light concentration on a specific region is alleviated. Thus, displacement is not easily recognized even when displacement occurs, and deterioration of the liquid crystal of the liquid crystal layer 40 is suppressed.

Method of Manufacturing Microlens Array Substrate

Next, a method of manufacturing the microlens array substrate 10 according to the first embodiment will be described. FIGS. 7A to 8C are schematic cross-sectional views illustrating the method of manufacturing the microlens array substrate according to the first embodiment. Specifically, each drawing of FIGS. 7A to 8C corresponds to schematic cross-sectional views taken along the lines VII-VII and VIII-VIII of FIG. 4.

Figure 7A:
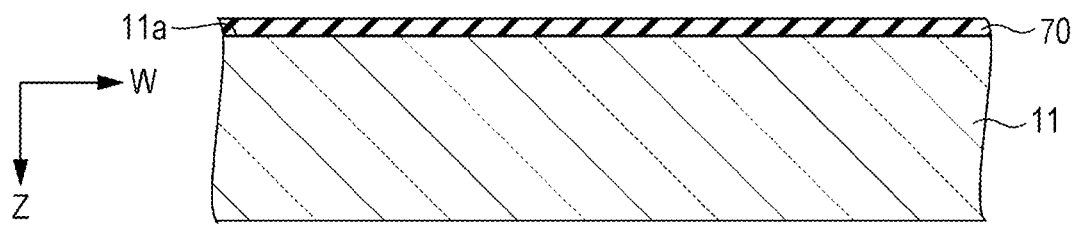
FIGS. 7A to 7D are schematic cross-sectional views illustrating a method of manufacturing a microlens array substrate according to the first embodiment.

First, as illustrated in FIG. 7A, for example, a control film 70 made of an oxide film of $SiO_2$ or the like is formed on the upper surface 11a of the substrate 11 with optical transparency, which is made from quartz and the like. The control film 70 has a different etching rate from the etching rate of the substrate 11 in isotropic etching and has a function of controlling an etching rate in the width direction (W-direction) with respect to an etching rate in the depth direction (Z-direction) when the concave portion 12 is formed.

After the control film 70 is formed, the control film 70 is annealed at a predetermined temperature. The etching rate of the control film 70 varies depending on a temperature at the time of annealing. Accordingly, by appropriately setting the temperature at the time of annealing, the etching rate of the control film 70 can be adjusted.

Figure 7B:
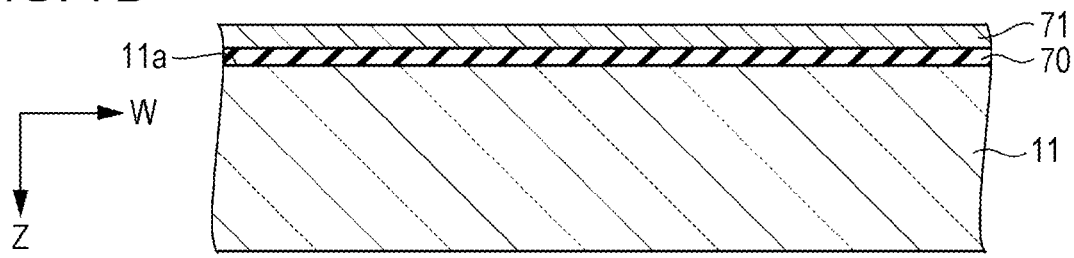
Figure 7C:
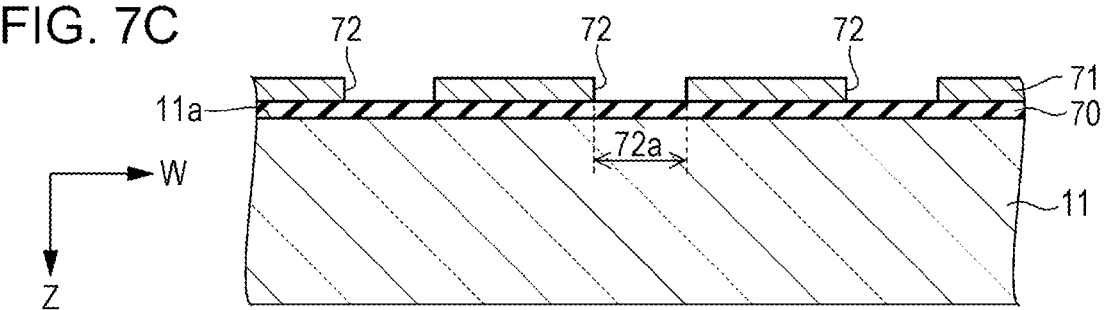

Next, as illustrated in FIG. 7B, a mask layer 71 is formed on the control film 70. Subsequently, as illustrated in FIG. 7C, the mask layer 71 is patterned to form an opening portion 72 on the mask layer 71. The opening portion 72 has an almost circular shape as seen from a plan view, similar to the shape of the flat portion 12a of the concave portion 12 to be formed, and the diameter thereof 72a is set to be almost the same as the diameter R1 of the flat portion 12a. In other words, the shape and the diameter of the flat portion 12a of the concave portion 12 to be formed is determined by the opening portion 72 of the mask layer 71.

Figure 7D:
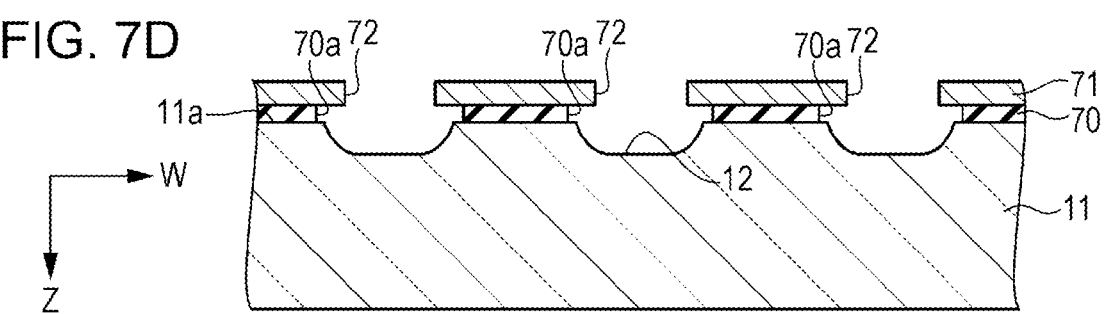

Next, as illustrated in FIG. 7D, isotropic etching is performed on the substrate 11 covered by the control film 70 through the opening portion 72 of the mask layer 71. In the isotropic etching, an etching liquid (for example, hydrofluoric acid solution) by which the etching rate of the control film 70 becomes higher than the etching rate of the substrate 11 is used. The control film 70 and the substrate 11 are etched from the opening portion 72 by the isotropic etching. Thus, an opening portion 70a is formed in the control film 70 and also the concave portion 12 is formed on the substrate 11.

Figure 8A:
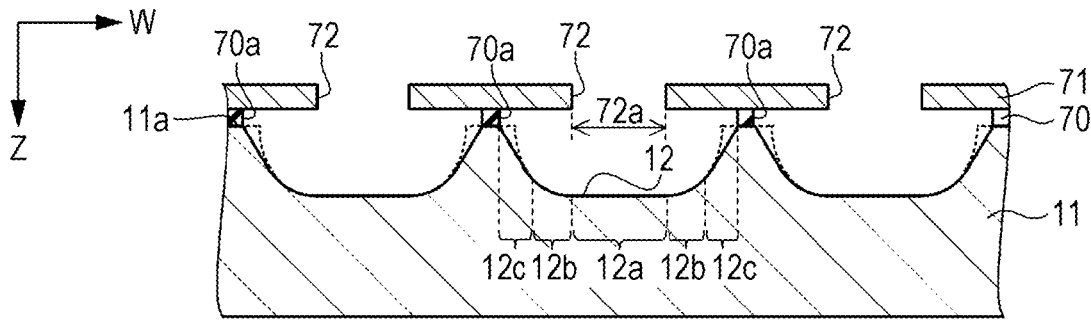
FIGS. 8A to 8C are schematic cross-sectional views illustrating the method of manufacturing a microlens array substrate according to the first embodiment.

Next, as illustrated in FIG. 8A, the concave portion 12 expands as the isotropic etching proceeds, and a portion corresponding to the opening portion 72 of the mask layer 71 in the concave portion 12 as seen from a plan view becomes almost flat. Accordingly, the flat portion 12a is formed at the center portion of the concave portion 12. In addition, the curved surface portion 12b is formed so as to surround the flat portion 12a.

Here, when the control film 70 is not provided between the substrate 11 and the mask layer 71, as illustrated in FIG. 8A, the curved surface portion 12b is formed until the curved surface portion reaches the upper surface 11a of the substrate 11. In the embodiment, the amount of the control film 70 etched per unit time becomes larger than the amount of the substrate 11 etched per unit time during the isotropic etching by providing the control film 70 between the substrate 11 and the mask layer 71.

Accordingly, the amount of the opening portion 70a of the control film 70 expanding becomes larger than the amount of the concave portion 12 expanding in the depth direction, and thus, with the expansion of the opening portion 70a, the concave portion 12 expands in the width direction. Therefore, the amount of the substrate 11 etched per unit time in the width direction is increased. Thus, the edge portion 12c is formed in a tapered shape so as to surround the curved surface portion 12b.

As described above, the shape and the diameter of the flat portion 12a of the concave portion 12 can be controlled by the shape and the diameter of the opening portion 72 of the mask layer 71. In addition, each size of the curved surface portion 12b and the edge portion 12c of the concave portion 12 is controlled by the etching rate in the width direction with respect to the etching rate of the substrate 11 in the depth direction, and a difference between the etching rates can be adjusted by the temperature setting at the time of annealing the control film 70.

Figure 8B:
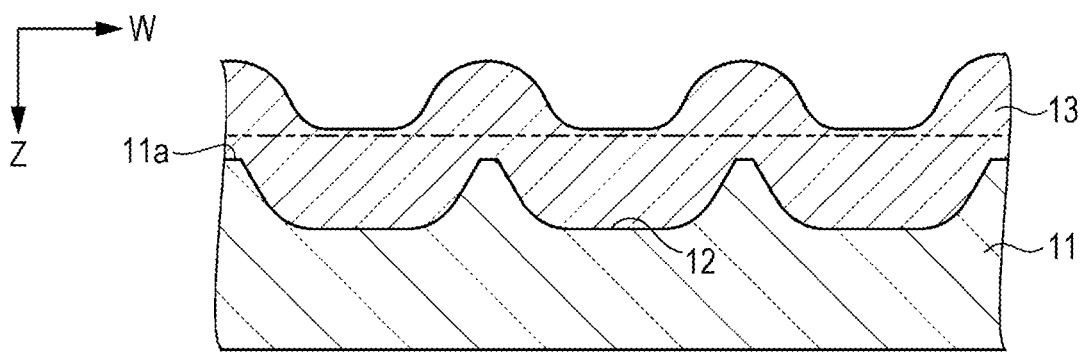

Next, as illustrated in FIG. 8B, the mask layer 71 is removed from the substrate 11, and then, the lens layer 13 is formed by depositing an inorganic material having optical transparency and having a higher refractive index than the refractive index of the substrate 11 so as to fill in the concave portion 12 while covering the upper surface 11a of the substrate 11. The lens layer 13 can be formed by, for example, a CVD method. Since the lens layer 13 is formed so as to fill in the concave portion 12, the surface of the lens layer 13 has an irregular shape in which irregularity resulting from the concave portion 12 of the substrate 11 is reflected.

Subsequently, flattening processing is performed on the lens layer 13. In the flattening processing, the lens layer 13 is flattened such that a portion in which the irregularity of the upper layer of the lens layer 13 is formed (upper portion from the two-dot chain line illustrated in FIG. 8B) is polished and removed by, for example, chemical mechanical polishing (CMP) processing or the like to make the upper surface of the lens layer 13 flat.

Figure 8C:
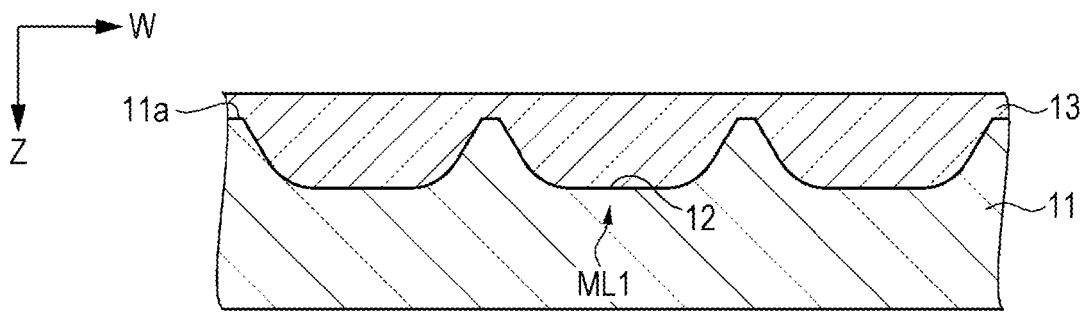

As a result of performing the flattening processing on the lens layer 13, as illustrated in FIG. 8C, the upper surface of the lens layer 13 is flattened to complete the microlens array substrate 10. The microlens ML1 is configured by filling the concave portion 12 with the material of the lens layer 13 in the microlens array substrate 10.

In FIGS. 15A to 15C, an example of a method of manufacturing the microlens ML4 of the related art is illustrated. As illustrated in FIG. 15A, an opening portion 74 is formed on the mask layer 71 and an isotropic etching process is performed on the substrate 11 through the opening portion 74 to form an almost spherical concave portion 16. The diameter of the opening portion 74 formed on the mask layer 71 is, for example, smaller than 10% of the arrangement pitch P2 of the pixel P.

At this time, when the diameter of the concave portion 16 to be formed is the same as the maximum diameter (R1+R2×2) of the concave portion 12, the depth D2 of the concave portion 16 is D2≈(R1+R2×2)/2 and is larger (deeper) than the depth D1 of the concave portion 12 of the embodiment indicated by a broken like in FIG. 15A. Therefore, the amount of the substrate 11 etched is larger than in the embodiment, and thus the number of isotropic etching processing is increased.

As illustrated in FIG. 15B, when the lens layer 13 is formed so as to fill in the concave portion 16 of the substrate 11, the amount of the lens layer 13 used for filling in the concave portion 16 is larger than in the embodiment, and thus, the number of processes is increased in the process of depositing the lens layer 13 by the CVD method. Further, the surface irregularity of the lens layer 13 resulting from the concave portion 16 becomes larger than in the embodiment, and thus, the amount of the lens layer polished is increased in the CMP processing process of the lens layer 13. Thus, the number of processes is increased.

As described above, in the configuration of the microlens ML1 according to the first embodiment, by making the depth D1 of the concave portion 12 shallow, the number of processes and the amount of material used in the manufacturing process of the microlens array substrate 10 can be reduced. In addition, the thickness of the deposited lens layer 13 becomes more uniform and the surface irregularity becomes smaller. Thus, the surface flatness of the lens layer 13 can be improved.

Second Embodiment

Figure 10A:
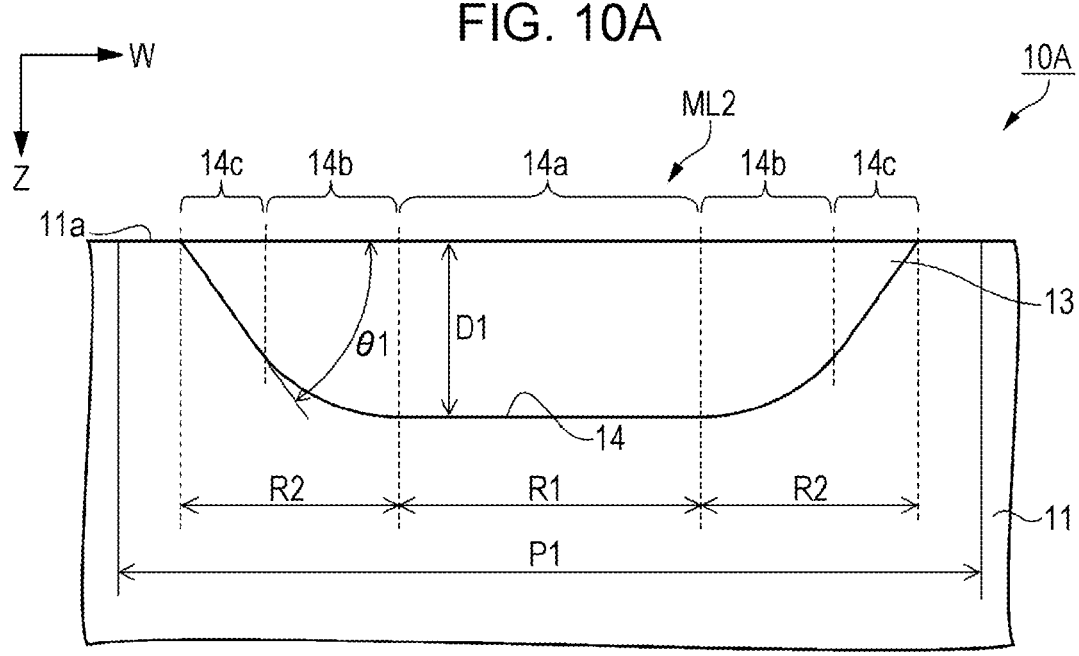
FIGS. 10A and 10B are schematic cross-sectional views illustrating the configuration of the microlens according to the second embodiment.
Figure 10B:
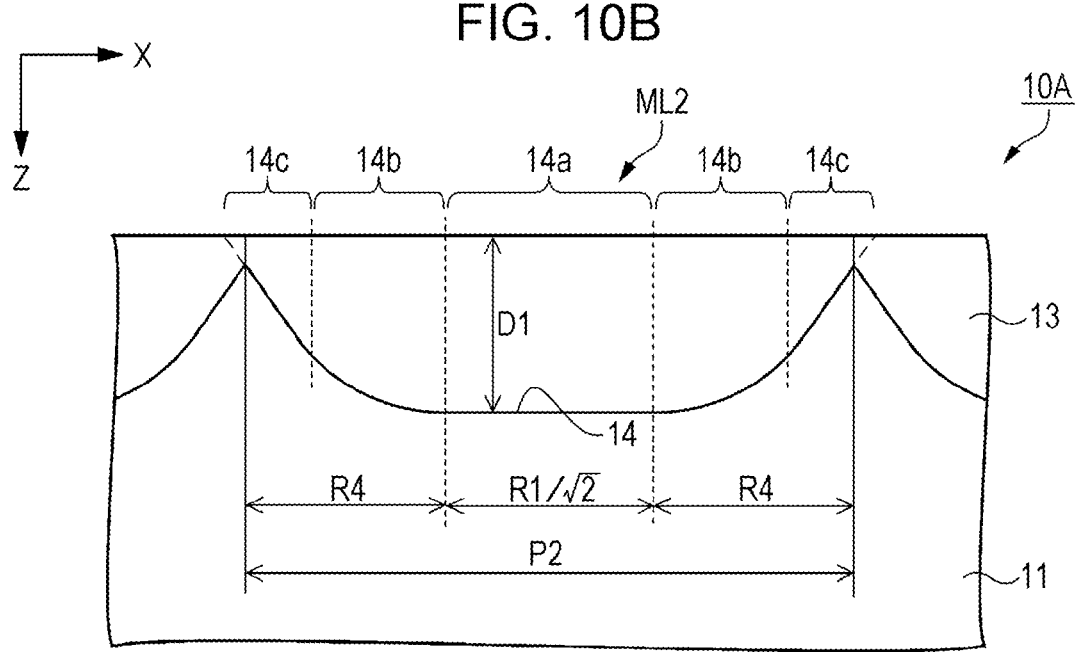

A microlens array substrate according to a second embodiment has almost the same configuration as the configuration of the first embodiment except that a configuration of the microlens is different. Here, different parts of the configuration of the microlens between the first embodiment and the second embodiment will be mainly described. FIG. 9 is a schematic plan view illustrating the configuration of the microlens according to the second embodiment. FIGS. 10A and 10B are schematic cross-sectional views illustrating the configuration of the microlens according to the second embodiment. Specifically, FIG. 10A is a schematic cross-sectional view taken along the line XA-XA of FIG. 9, and FIG. 10B is a schematic cross-sectional view taken along the line XB-XB of FIG. 9. In addition, FIG. 11 is a schematic view illustrating a light condensing effect of the microlens according to the second embodiment. Constituent elements which are common to the first embodiment are given like reference numerals, and the descriptions thereof are omitted.

Microlens

As illustrated in FIG. 9, a microlens array substrate 10A according to the second embodiment includes a microlens ML2 configured by a concave portion 14. The concave portion 14 has a flat portion 14a arranged at the center portion, a curved surface portion 14b arranged around the flat portion 14a, and an edge portion 14c arranged around the curved surface portion 14b. The flat portion 14a, the curved surface portion 14b, and the edge portion 14c are continuously formed. The flat portion 14a has a rectangular planar shape. Four rectangular corners of the flat portion 14a may be rounded. The curved surface portion 14b and the edge portion 14c have a rectangular planar shape and four corners of each portion are rounded.

The length of the diagonal line that is the maximum length of the flat portion 14a of the concave portion 14 is defined as R1 as the diameter of the flat portion 12a of the concave portion 12 in the first embodiment. When the planar shape of the flat portion 14a is rectangular, the length of the flat portion 14a in the X-direction and the Y-direction is R1/√2. Since the flat portion 12a of the concave portion 12 of the first embodiment is a circumscribed circle relative to the flat portion 14a, the area of the flat portion 14a is smaller than the area of the flat portion 12a of the concave portion 12.

As illustrated in FIG. 10A, a distance from the flat portion 14a to the outer edge of the edge portion 14c is defined as R2 in a direction along the W-direction (diagonal line) in which the diameter of the concave portion 14 becomes maximum in the region of the pixel P as in the concave portion 12 of the first embodiment. An angle between the edge portion 14c and the upper surface 11a of the substrate 11 is defined as θ1 as in the concave portion 12 of the first embodiment. That is, in the W-direction, the cross-sectional shape of the concave portion 14 is the same as the cross-sectional shape of the concave portion 12 of the first embodiment.

In addition, as illustrated in FIG. 10B, when a distance from the flat portion 14a to the outer edge of the edge portion 14c (outer edge of the pixel P) is defined as R4 in a direction along the X-direction in which the diameter of the concave portion 14 becomes minimum in the region of the pixel P, R4 is smaller than R2 and R4=(P2−R1/√2)/2 is established. Thus, the distance R4 from the flat portion 14a to the outer edge of the edge portion 14c is longer than the distance R3 from the flat portion 12a to the outer edge of the edge portion 12c in the concave portion 12 of the first embodiment. That is, in the X-direction, the cross-sectional shape of the concave portion 14 is different from the cross-sectional shape of the concave portion 12 of the first embodiment.

In the microlens ML2 (concave portion 14) according to the second embodiment, a difference (R2−R4) between the distances from the flat portion 14a to the outer edge of the edge portion 14c in the X-direction and the W-direction is smaller than a difference (R2−R3) between the distances from the flat portion 12a to the outer edge of the edge portion 12c of the concave portion 12 according to the first embodiment in the X-direction and the W-direction. That is, in the concave portion 14, a difference in the width (length) of the edge portion 14c over the entire circumference of the region of the pixel P is smaller than a difference in the width (length) of the edge portion of the concave portion 12.

Therefore, compared to the concave portion 12 of the first embodiment, the edge portion 14c, which refracts the light incident on the edge portion of the region of the pixel P toward the center of the pixel P without condensing the light, is uniformly arranged over the entire circumference of the region of the pixel P. Accordingly, the liquid crystal device 1 including the microlens ML2 (concave portion 14) according to the second embodiment can obtain a brighter display and better contrast.

FIG. 11 is a schematic view illustrating the illuminance distribution of the microlens ML2 according to the second embodiment in the region of the pixel P. FIG. 11 illustrates a case in which the maximum length R1 of the flat portion 14a is 50% of the arrangement pitch P2 of the pixel P. FIG. 11 illustrates illuminance with five stages of S1c, S2c, S3c, S4c, and S5c. Here, S1c is the highest illuminance, and illuminance is decreased in the order of S2c, S3c, S4c, and S5c.

As illustrated in FIG. 11, in the microlens ML2 according to the second embodiment, an S2c region having high illuminance is annularly distributed so as to spread corresponding to four corner portion of the flat portion 14a. Accordingly, as in the microlens ML1 according to the first embodiment, more uniform brightness distribution is achieved in the region of the pixel P and light concentration on a specific region is alleviated, compared to the almost spherical microlens ML4 of the related art. Thus, displacement is not easily recognized when displacement occurs, and deterioration of the liquid crystal of the liquid crystal layer 40 is suppressed.

Figure 12A:
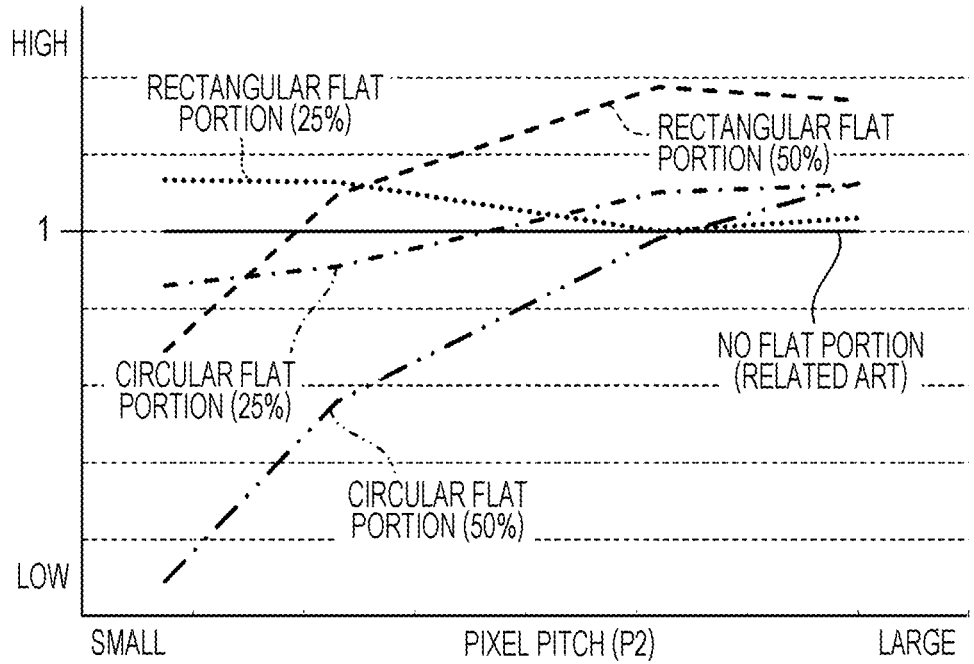
FIGS. 12A and 12B are graphs illustrating a relationship between the size of a flat portion region of the microlens and light utilization efficiency.
Figure 12B:
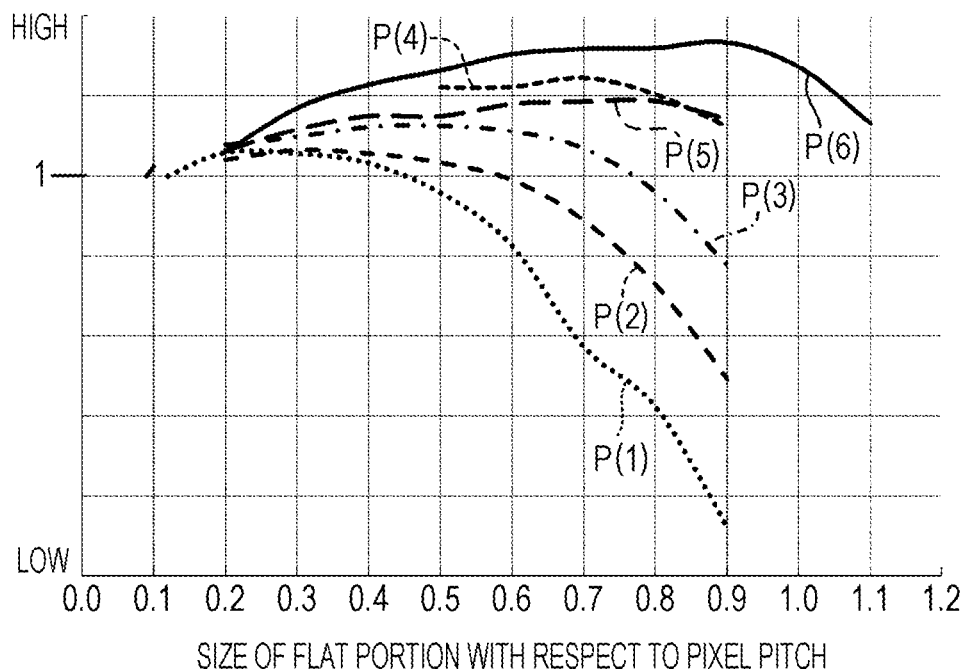

Here, relationships of the size of the region of the flat portion and the light utilization efficiency in the microlens ML1 according to the first embodiment and the size of the region of the flat portion 14a and the light utilization efficiency in the microlens ML2 according to the second embodiment will be described referring to FIGS. 12A and 12B. FIGS. 12A and 12B are graphs illustrating the relationship between the size of the flat portion region and the light utilization efficiency in the microlens. Here, the "light utilization efficiency" refers to brightness of an image to be displayed on a screen using the liquid crystal device 1 including the microlens ML1 or the microlens ML2 as a liquid crystal light valve of a projector.

FIG. 12A is a graph in which the light utilization efficiency of the microlens ML1 (concave portion 12) according to the first embodiment having the almost circular flat portion 12a and the light utilization efficiency of the microlens ML2 (concave portion 14) according to the second embodiment having the almost circular flat portion 14a are compared by simulation while the spherical microlens ML4 of the related art is set as a reference. The horizontal axis refers to the arrangement pitch P2 of the pixel P (hereinafter, simply referred to as a pixel pitch). The vertical axis refers to light utilization efficiency, and the light utilization efficiency of the spherical microlens ML4 (not having a flat portion) of the related art is set as "1".

In FIG. 12A, the pixel pitch is changed and a case in which the maximum lengths R1 of the flat portion 12a and the flat portion 14a are 25% of each pixel pitch and a case in which the maximum lengths R1 of the flat portion 12a and the flat portion 14a are 50% of each pixel pitch are compared. When the pixel pitch is 10 μm, the maximum length R1 of the flat portion 14a is 2.5 μm in the case in which the maximum length of the flat portion is 25% of the pixel pitch, and the maximum length of the flat portion is 5 μm in the case in which the maximum length of the flat portion is 50% of the pixel pitch.

In both the almost circular flat portion 12a and the almost rectangular flat portion 14a, there is a tendency that the larger the pixel pitch is, the higher the light utilization efficiency is. This tendency becomes stronger in the case in which the maximum length R1 is 50% of the pixel pitch than in the case in which the maximum length R1 is 25% of the pixel pitch. On the other hand, when the pixel pitch is small, the light utilization efficiency is higher in the case in which the maximum length R1 is 25% of the pixel pitch than in the case in which the maximum length R1 is 50% of the pixel pitch. Comparing the almost circular flat portion 12a and the almost rectangular flat portion 14a, there is no significant difference in the case in which the maximum length R1 is 25% of the pixel pitch, but in the case in which the maximum length R1 is 50% of the pixel pitch, the light utilization efficiency of the almost rectangular flat portion 14a is high.

As described above, in the microlens ML1 according to the first embodiment and the microlens ML2 according to the second embodiment, when the pixel pitch is large, higher light utilization efficiency can be obtained than in the spherical microlens ML4 of the related art. In addition, the effect of the microlens ML2 according to the second embodiment is greater than the effect of the microlens ML1 according to the first embodiment. This is considered that the edge portion 14c, which refracts the light incident on the edge portion of the region of the pixel P toward the center of the pixel P without condensing the light, can be more uniformly arranged over the entire circumference of the region of the pixel P in the concave portion 14 of the second embodiment compared to the concave portion 12 of the first embodiment.

FIG. 12B is a graph in which the light utilization efficiency when the size of the almost rectangular flat portion 14a of the microlens ML2 (concave portion 14) according to the second embodiment is changed is compared by simulation while the spherical microlens ML4 of the related art is set as a reference. The horizontal axis refers to a ratio of the maximum length R1 of the flat portion 14a to the pixel pitch (P2). The vertical axis refers to light utilization efficiency and the light utilization efficiency of the spherical microlens ML4 (not having a flat portion) of the related art is set as "1". P(1), P(2), P(3), P(4), P(5), and P(6) respectively correspond to different pixel pitch values, and the pixel pitch increases in this order.

When the pixel pitch has any one of the above values, the light utilization efficiency is improved as the size of the flat portion 14a with respect to the pixel pitch is increased. However, when the size of the flat portion 14a with respect to the pixel pitch is further increased, there is a tendency that the light utilization efficiency may be decreased. Accordingly, at any one of the pixel pitch values, there is an appropriate range for the size of the flat portion 14a. Comparing the cases in which the pixel pitch has each value of P(1), P(2), P(3), P(4), P(5), and P(6), the larger the pixel pitch is, the higher the light utilization efficiency is. In addition, the larger the pixel pitch is, the wider the appropriate range for the size of the flat portion 14a (range in which the light utilization efficiency is increased) is, and thus, light utilization efficiency is improved when the size of the flat portion 14a is large.

Method of Manufacturing Microlens Array Substrate

A method of manufacturing the microlens array substrate 10A according to the second embodiment is different from the method of manufacturing the microlens array substrate 10 according to the first embodiment in the shape of the opening portion 72 of the mask layer 71 illustrated in FIG. 7C. In the second embodiment, the shape of the opening portion 72 is almost rectangular as seen from a plan view, and the length of the diagonal line of the opening portion 72 is set to be almost the same as the diagonal line R1 of the flat portion 14a. The method of manufacturing the microlens array substrate 10A is almost the same as the method of manufacturing the microlens array substrate 10 according to the first embodiment expect for the above-described points, and thus, the description thereof will be omitted.

Third Embodiment

Electronic Apparatus

Figure 13:
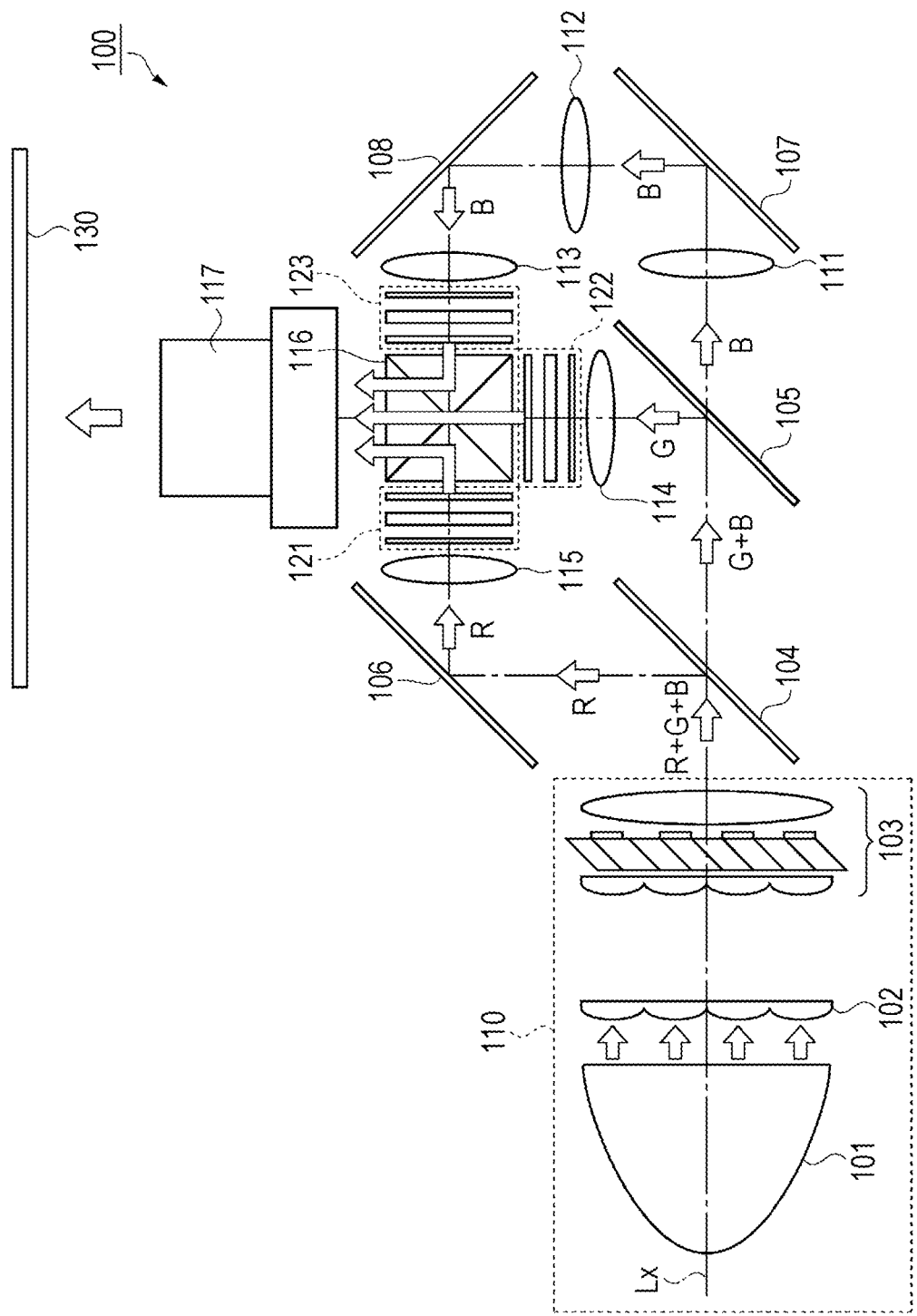
FIG. 13 is a schematic view illustrating a configuration of a projector as an electronic apparatus according to a third embodiment.

Next, an electronic apparatus according to a third embodiment will be described referring to FIG. 13. FIG. 13 is a schematic view illustrating a configuration of a projector as the electronic apparatus according to the third embodiment.

As illustrated in FIG. 13, a projector 100 (projection type display apparatus) as the electronic apparatus according to the third embodiment includes a polarized-light emission device 110, two dichroic mirrors 104 and 105, three reflection mirrors 106, 107, and 108, five relay lenses 111, 112, 113, 114, and 115, three liquid crystal light valves 121, 122, and 123, a cross dichroic prism 116, and a projection lens 117.

The polarized-light emission device 110, for example, includes a lamp unit 101 as a light source that is made from a white light source, such as an ultrahigh pressure mercury lamp, or a halogen lamp, an integrator lens 102, and a polarized-light conversion element 103. The lamp unit 101, the integrator lens 102, and the polarized-light conversion element 103 are arranged along a system optical axis Lx.

Among luminous flux of polarized light emitted from the polarized-light emission device 110, the dichroic mirror 104 reflects red light (R) and allows green light (G) and blue light (B) to pass through. The other dichroic mirror 105 reflects the green light (G) that passes through the dichroic mirror 104 and allows the blue light (B) to pass through.

After being reflected from the dichroic mirror 104, the red light (R) is reflected from the reflection mirror 106 and then is incident on the liquid crystal light valve 121 via the relay lens 115. After being reflected from the dichroic mirror 105, the green light (G) is incident on the liquid crystal light valve 122 via the relay lens 114. The blue light (B) that passes through the dichroic mirror 105 is incident on the liquid crystal light valve 123 via a light guide system that is configured by the three relay lens 111, 112, and 113 and the two reflection mirrors 107 and 108.

The transmission type liquid crystal light valves 121, 122, and 123 as light modulation elements are arranged opposite to surfaces of the cross dichroic prism 116 that color light is incident on, respectively. The color light that is incident on the liquid crystal light valve 121, 122, and 123 is modulated, based on image information (an image signal) and is emitted toward the cross dichroic prism 116.

The cross dichroic prism 116 is configured by four right angle prisms that are attached to one another. A dielectric multilayer film that reflects red light and a dielectric multilayer film that reflects blue light are formed, in the shape of a cross, on the inside surface of the cross dichroic prism 116. Light of 3 colors is synthesized by these dielectric multilayer films and thus light representing a color image is synthesized. The synthesized light is projected on a screen 130 by the projection lens 117 which is a projection optical system, and the image is displayed in an enlarged manner.

The liquid crystal light valve 121 results from applying the liquid crystal device 1 that includes any of the microlens array substrates 10 and 10A according to the above-described embodiments, respectively. The liquid crystal light valve 121 is arranged between a pair of polarization elements that are arranged in a crossed Nichol prism in the incident direction of color light and in the emission direction of color light, with spacing in-between. The same applies to the other liquid crystal light valves 122 and 123.

According to the configuration of the projector 100 according to the third embodiment, since the liquid crystal device 1 capable of obtaining a bright display and good contrast is provided although the plural pixels P are arranged with a high resolution, it is also possible to provide the projector 100 that is high in quality and is bright in display.

Each of the embodiments described above exemplifies only one aspect of the invention, and so, arbitrary modifications to the embodiment and arbitrary application of the embodiments are possible within the scope of the invention. Modification examples are considered as follows.

Modification Example 1

Figure 14:
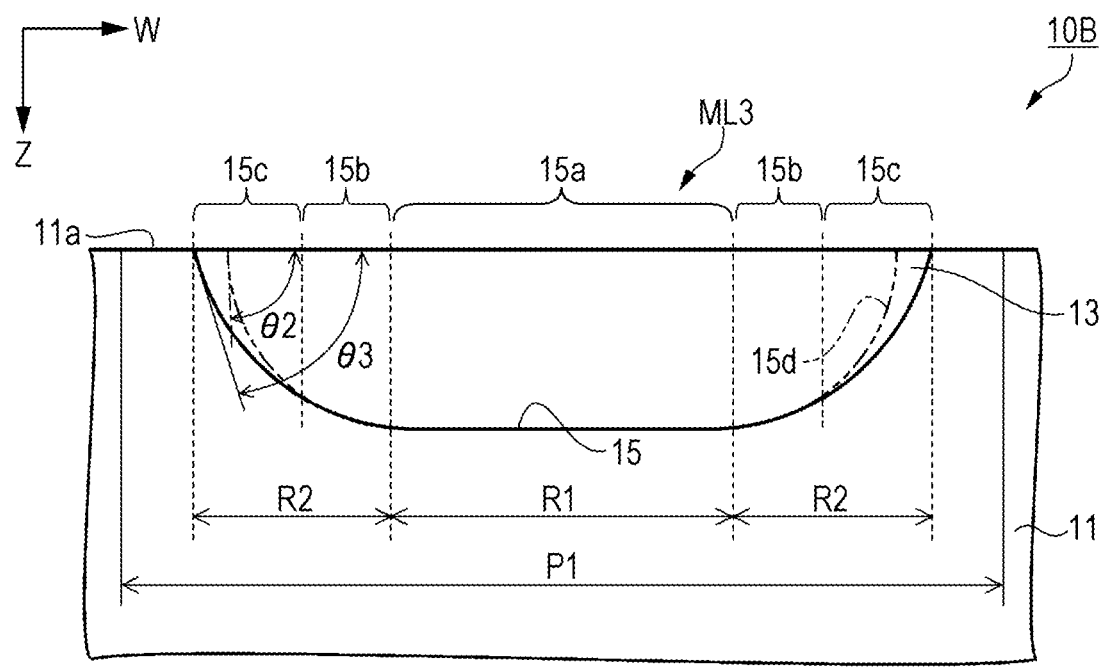
FIG. 14 is a schematic cross-sectional view illustrating a configuration of a microlens according to Modification Example 1.

Each of the microlens array substrate 10 and 10A according to each of the embodiments includes the respective edge portions 12c and 14c having a tapered shape around the curved surface portions 12b and 14b of the concave portions 12 and 14, but the invention is not limited to the configuration. For example, the edge portion may not have a tapered shape and may have a curved shape. FIG. 14 is a schematic cross-sectional view illustrating a configuration of the microlens according to Modification Example 1. Constituent elements common to the first embodiment are given like reference numerals, and their descriptions are omitted.

As illustrated in FIG. 14, a microlens array substrate 10B according to Modification Example 1 includes a microlens ML3 configured with a concave portion 15. The concave portion 15 has a flat portion 15a arranged at the center portion, a curved surface portion 15b arranged around the flat portion 15a, and an edge portion 15c arranged around the curved surface portion 15b. The flat portion 15a, the curved surface portion 15b, and the edge portion 15c are continuously formed. Although the edge portion 15c has a curved shape, the curvature radius of the edge portion is larger than the curvature radius of the curved surface portion 15b. A virtual curved surface 15d obtained by extending the curved surface portion 15b toward the upper surface 11a is indicated by a two-dot chain line. When an angle between a tangent at the end portion of the virtual curved surface 15d and the upper surface 11a is defined as θ2, and an angle between a tangent at the end portion of the edge portion 15c and the upper surface 11a is defined as θ3, θ3 is smaller than θ2.

Although the concave portion 15 is formed in the same manner as the concave portion 12 according to the first embodiment or the concave portion 14 according to the second embodiment, in the etching process illustrated in FIG. 8C, the concave portion 15 is formed such that the curvature radius increases from the curved surface portion 15b to the outer edge. The shape of the concave portion 15 can be formed by controlling the amount of the substrate 11 etched per unit time in the width direction with respect to the amount of the substrate etched per unit time in the depth direction.

Even when the edge portion 15c has a curved shape instead of a tapered shape as in the microlens ML3 of Modification Example 1, θ3 is set to be smaller than θ2, and thus, the angle at which the light incident on the edge portion 15c can be decreased compared to the microlens ML4 having the almost spherical concave portion 16 of the related art. Accordingly, it is possible to obtain a brighter display and better contrast than in the related art.

Modification Example 2

In the methods of manufacturing the microlens array substrates 10 and 10A according to the above-described embodiments, each of the concave portions 12 and 14 is formed such that a difference in etching rate in the width direction and the depth direction are controlled in the process of performing isotropic etching by providing the shape of the opening portion 72 of the mask layer 71, and the control film 70. However, the invention is not limited thereto. For example, each of the concave portions 12 and 14 can be formed by transferring the shape of the concave portion onto the substrate 11 in such a manner that a resist layer is formed on the substrate 11, an original form of the concave portion 12 or 14 is formed on the resist layer by exposure using a gray scale mask, multistage exposure, or the like, and anisotropic etching is performed on the resist layer and the substrate 11 at almost the same etch selectivity. In this case, the control film 70 is not necessary.

Modification Example 3

In the above-described liquid crystal device 1, the microlens array substrate 10 is provided with the opposite substrate 30, but the invention is not limited to this configuration. For example, the microlens array substrate 10 may be provided with the element substrate 20. In addition, the microlens array substrate 10 may be provided with both the element substrate 20 and the opposite substrate 30.

Modification Example 4

An electronic apparatus to which the liquid crystal device 1 according to the above-described embodiments can be applied is not limited to the projector 100. For example, the liquid crystal device 1 can be suitably used as a display unit of an information terminal, such as a projection type HUD (a head-up display), a direct-view type HMD (a head-mounted display), an electronic book, a personal computer, a digital still camera, a liquid crystal television, a view finder type or monitor direct view type video recorder, a car navigation system, an electronic organizer, and a POS.

The entire disclosure of Japanese Patent Application No. 2013-206152, filed Oct. 1, 2013 is expressly incorporated by reference herein.

What is claimed is:

1. A microlens array substrate comprising:
   a substrate having transparency and having a plurality of concave portions provided on a first surface to correspond to a plurality of pixels; and
   a lens layer having a different refractive index from a refractive index of the substrate, which is provided on the first surface of the substrate to fill in the plurality of concave portions,
   wherein each of the plurality of concave portions has a flat portion arranged at the center portion, a curved surface portion arranged to surround the flat portion, an edge portion arranged to surround the curved surface portion and connected to the first surface of the substrate, and
   an angle between the edge portion and the first surface in a cross section passing through the center portion is smaller than an angle between a virtual curved surface obtained by extending the curved surface portion toward the first surface and the first surface.

2. The microlens array substrate according to claim 1, wherein the edge portion is an inclined surface inclined from the first surface toward the curved surface portion in the cross section.

3. An electro-optic device comprising:
   a first substrate;
   a second substrate arranged opposite to the first substrate; and
   an electro-optic layer arranged between the first substrate and the second substrate,
   wherein at least one of the first substrate and the second substrate is the microlens array substrate according to claim 2.

4. An electronic apparatus comprising:
   the electro-optic device according to claim 3.

5. The microlens array substrate according to claim 1, wherein the flat portion has an almost circular shape as seen from a plan view.

6. An electro-optic device comprising:
   a first substrate;
   a second substrate arranged opposite to the first substrate; and
   an electro-optic layer arranged between the first substrate and the second substrate,
   wherein at least one of the first substrate and the second substrate is the microlens array substrate according to claim 3.

7. An electronic apparatus comprising:
   the electro-optic device according to claim 6.

8. The microlens array substrate according to claim 1, wherein the flat portion has an almost rectangular shape as seen from a plan view.

9. An electro-optic device comprising:
a first substrate;
a second substrate arranged opposite to the first substrate; and
an electro-optic layer arranged between the first substrate and the second substrate,
wherein at least one of the first substrate and the second substrate is the microlens array substrate according to claim 8.

10. An electronic apparatus comprising:
the electro-optic device according to claim 9.

11. The microlens array substrate according to claim 1, wherein the depth of the flat portion is smaller than a ½ length of a diagonal line of the pixel.

12. An electro-optic device comprising:
a first substrate;
a second substrate arranged opposite to the first substrate; and
an electro-optic layer arranged between the first substrate and the second substrate,
wherein at least one of the first substrate and the second substrate is the microlens array substrate according to claim 11.

13. An electronic apparatus comprising:
the electro-optic device according to claim 12.

14. The microlens array substrate according to claim 1, wherein the maximum length of the flat portion in the cross section passing through the center portion is 10% or more of the arrangement pitch of the plurality of pixels.

15. An electro-optic device comprising:
a first substrate;
a second substrate arranged opposite to the first substrate; and
an electro-optic layer arranged between the first substrate and the second substrate,
wherein at least one of the first substrate and the second substrate is the microlens array substrate according to claim 14.

16. An electronic apparatus comprising:
the electro-optic device according to claim 15.

17. An electro-optic device comprising:
a first substrate;
a second substrate arranged opposite to the first substrate; and
an electro-optic layer arranged between the first substrate and the second substrate,
wherein at least one of the first substrate and the second substrate is the microlens array substrate according to claim 1.

18. An electronic apparatus comprising:
the electro-optic device according to claim 17.

* * * * *